(12) United States Patent
Nakata

(10) Patent No.: US 10,834,657 B2
(45) Date of Patent: Nov. 10, 2020

(54) COMMUNICATION CONTROLLER FOR CONTROLLING A WIRELESS COMMUNICATION DEVICE

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/999,563

(22) Filed: Aug. 20, 2018

(65) Prior Publication Data

US 2019/0059037 A1 Feb. 21, 2019

(30) Foreign Application Priority Data

Aug. 21, 2017 (JP) ................. 2017-158770

(51) Int. Cl.

| | |
|---|---|
| *H04W 40/02* | (2009.01) |
| *H04W 64/00* | (2009.01) |
| *H04L 12/721* | (2013.01) |
| *H04W 28/20* | (2009.01) |
| *H04W 40/24* | (2009.01) |
| *H04W 40/20* | (2009.01) |
| *H04W 40/18* | (2009.01) |
| *H04L 12/729* | (2013.01) |
| *H04W 4/02* | (2018.01) |

(52) U.S. Cl.
CPC ........ *H04W 40/026* (2013.01); *H04L 45/124* (2013.01); *H04L 45/125* (2013.01); *H04W 28/20* (2013.01); *H04W 40/18* (2013.01); *H04W 40/20* (2013.01); *H04W 40/246* (2013.01); *H04W 64/006* (2013.01); *H04W 4/02* (2013.01)

(58) Field of Classification Search
CPC ... H04L 45/124; H04L 45/125; H04L 45/126; H04W 28/20; H04W 40/026; H04W 40/18; H04W 40/20; H04W 40/246; H04W 64/006
See application file for complete search history.

(56) References Cited

U.S. PATENT DOCUMENTS

| | | | |
|---|---|---|---|
| 8,180,904 B1 * | 5/2012 | Albanese | ............ H04L 12/5692 709/228 |
| 2012/0140635 A1 * | 6/2012 | Aoki | ........................ H04L 45/12 370/238 |
| 2014/0200019 A1 | 7/2014 | Nishina | |
| 2017/0347236 A1 * | 11/2017 | Frusina | ............. H04M 1/72572 |

FOREIGN PATENT DOCUMENTS

JP 5692384 B2 4/2015

* cited by examiner

*Primary Examiner* — Kan Yuen
(74) *Attorney, Agent, or Firm* — Maschoff Brennan

(57) ABSTRACT

A communication controller is provided for controlling a wireless communication device disposed in a vehicle to transport data to a target device. The communication controller includes a searcher, a cost computer, a path determiner, and a communication control section. The searcher detects the current position of the vehicle, determines a travel plan of the vehicle, and searches for one or more transport paths for transporting data to the target device. The cost computer calculates a transport cost for each of the transport paths. The path determiner determines the lowest transport cost, selects the transport path, and determines the transmission conditions. The communication control section transmits the data to the target device when the transmission conditions are satisfied.

9 Claims, 14 Drawing Sheets

COMMUNICATION CONTROLLER FOR CONTROLLING A WIRELESS COMMUNICATION DEVICE

CROSS REFERENCE TO RELATED APPLICATION

The present application is based on and claims the benefit of priority of Japanese Patent Application No. 2017-158770, filed on Aug. 21, 2017, the disclosure of which is incorporated herein by reference.

TECHNICAL FIELD

The present disclosure generally relates to a communication controller for controlling a wireless communication device.

BACKGROUND INFORMATION

A core network device disclosed in Japanese patent document No. 5692384 prompts, i.e., acknowledges, a mobile terminal to communicate when a resource use rate of the subject core network device is lower than a predetermined threshold value.

Situations and conditions in communication, especially in wireless communication, may vary and differ from position to position, e.g., based on the position of the communication device. Various situations and conditions may include, for example, a communication speed available to the communication device, a communication charge for placing a call, and the like. When the communication device moves, e.g., travels from one position to another, the situations described above may change accordingly. Therefore, communication, e.g., placing a call, from the mobile terminal upon receiving an acknowledgement from the core network device may not be necessarily performed in a cost-efficient manner.

Also, it is not necessary to set or select a wireless communication path as the entire communication path to a destination device. Data may be stored in a storage medium and/or device, and the storage medium may be transported along, as a part of, the communication path for the data communication. In the following description, data transportation via wireless communication, and data transportation by using data storage medium are both considered as data transportation. Further, communication in the following description refers to both data transmission and data reception.

SUMMARY

It is an object of the present disclosure to provide a communication controller capable of advantageously transporting data in a cost-efficient or cost-effective manner.

In an aspect of the present disclosure, a communication controller for controlling a wireless communication device may be disposed in a movable body, such as a vehicle, to transport data to a target device. The communication controller may include a searcher, a cost computer, a path determiner, and a communication control section.

The searcher may be configured to search for transport path information for one or more transport paths to transport the data between the wireless communication device and the target device. The transport path information may include communication state requirements, which are either of (i) conditions for a communication position, which is the position at which data communication is performed, or (ii) conditions for a communication state, which may effectively restrict the communication position as the communication state may vary according to the communication position, for the wireless communication device. The conditions for a communication position of the wireless communication device may include the communication position of the wireless communication device to be satisfied for the communication of data. That is, the position at which data communication is performed. The conditions for a communication state of the wireless communication device may include variables with regard to the communication state that may need to be satisfied at the communication position of the wireless communication device. Here, variables may include the trade-offs between the communication position and communication state, for example, the communication quality, communication charges, and the like, that may be balanced by setting and adjusting the travel and communication parameters.

The cost computer may be configured to compute, a transport cost for the transportation of the data between the wireless communication device and the target device for each of the plurality of transport path information searched by the searcher. The transport cost may be computed based on a travel parameter and a communication parameter. The travel parameter may be a parameter regarding a travel of the movable body until the communication state requirements are satisfied. The communication parameter may be a parameter regarding the communication of the data by the wireless communication device when the communication state requirements are satisfied.

The path determiner may be configured to determine the transport path information that defines the transport path for transporting the data based on the transport cost computed by the cost computer for each of the plurality of pieces of transport path information.

The communication control section may be configured to control the wireless communication device to communicate the data (e.g., send and receive) based on the communication state requirements included in the transport path information determined by the path determiner.

In the above-described communication controller, the searcher searches for the transport path information that includes the communication state requirements. As such, many pieces of the transport path information are searched for and found, including different communication state requirements for the different transport paths for transporting the data.

The cost computer then calculates the transport cost based on two parameters, (a) the travel parameter for the travel of the movable body (e.g., vehicle) to a position that satisfies the communication state requirements along the transport path; and (b) the communication parameter for the data communication by the wireless communication device in a certain position that satisfies the communication state requirements. Based on such transport cost, the transport path information is determined and/or selected to define an actual transport path for transporting data, thereby advantageously enabling data transportation to the target device to be performed by the communication controller of the present disclosure.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Figure 1:
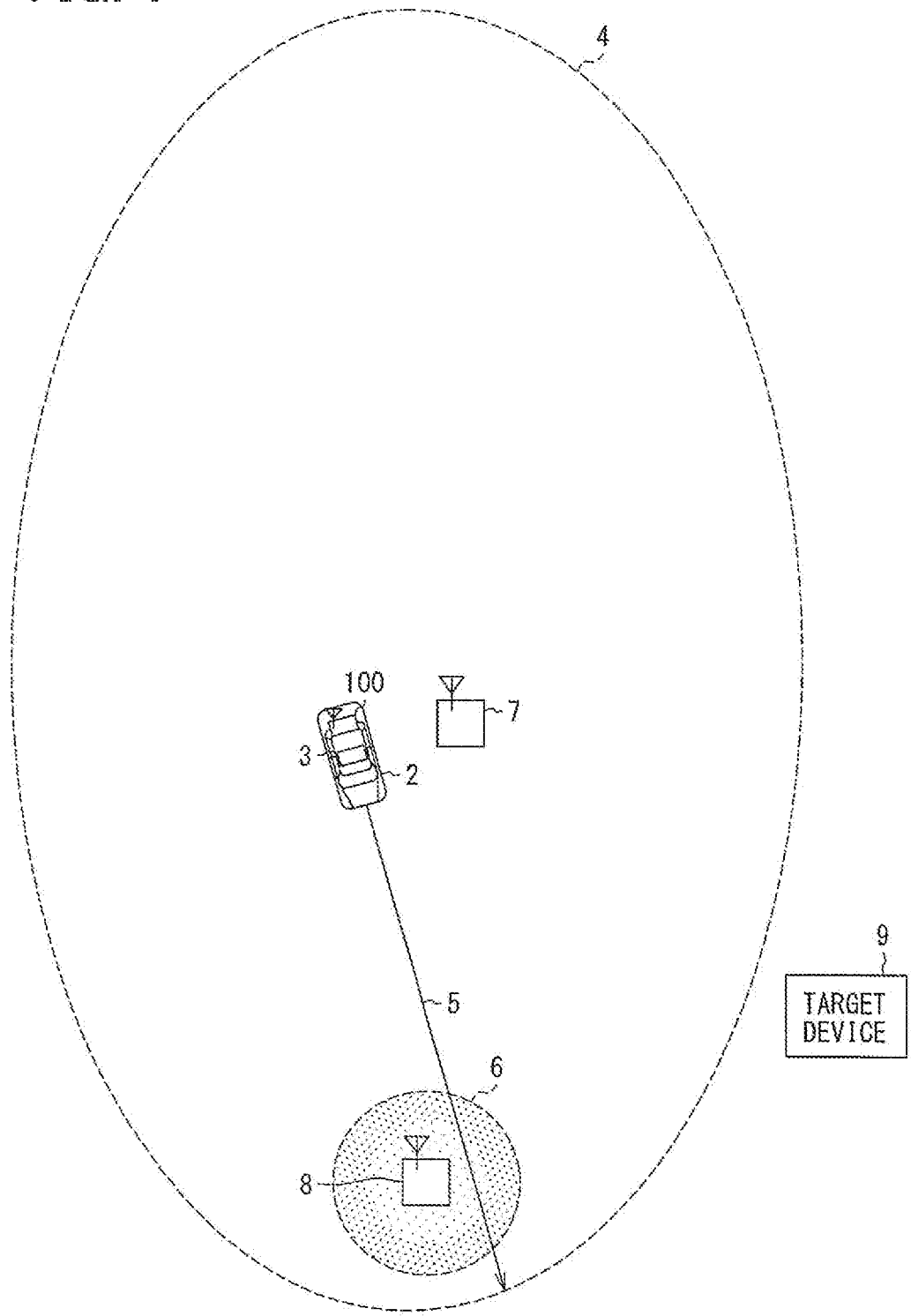
FIG. 1 illustrates a vehicle state where a vehicle is traveling toward a short-range communication area.

Hereafter, an embodiment of the present disclosure is described with reference to the accompanying figures. A vehicle 2 shown in FIG. 1 carries a communication controller 100 and a wireless communication device 3. In a state shown in FIG. 1, the vehicle 2 is in a wide-range communication area 4 in which wide-range wireless communications are enabled. A travel plan 5 of the vehicle 2 shows a plan where the vehicle 2 is about to imminently enter a short-range communication area 6. The vehicle 2 is an example of a movable body.

The wireless communication device 3 is a communication device which is capable of performing wide-range wireless communications and short-range wireless communications. The wide-range wireless communications in the present embodiment may use a public communication network. The wide-range wireless communications may be performed, for example, according to a long term evolution (LTE) telecommunications standard. The wide-range communication area 4 is an area in which wireless communications to one or more base stations 7 are enabled. A wide-range communication system may thus be a system that includes the base station(s) 7 and a management device managing the base station(s) 7.

The travel plan 5 forecasts a future position, or positions, of the vehicle 2. For example, the travel plan 5 during a route navigation, may be a guidance route from the current position leading to a destination.

The short-range communication area 6 is an area in which short-range wireless communications are enabled. The short-range wireless communication in the present embodiment may be communication via a wireless LAN (e.g., WiFi), and the short-range communication area may be an area in which wireless communications to an access point 8 by wireless LAN (e.g., WiFi) are enabled. A short-range communication system may thus be a system that performs short-range communication via the access points 8 that are disposed at various positions along a travel path of the vehicle 2.

A target device 9 is a device that is a data transmission destination of the communication from the wireless communication device 3. The target device 9 may be, for example, a server, and the wireless communication device 3 may transmit various data obtained during the travel of the vehicle 2, such as image data, to the target device 9.

The target device 9 can communicate with the wireless communication device 3 located in the wide-range communication area 4 by the wide-range wireless communications via the public communication network and the base station 7. The target device 9 can communicate with the wireless communication device 3 located in the short-range communication area 6 via the access point 8 by performing one or both of wireless and wired communications.

[Configuration of the Communication Controller 100]

Figure 2:
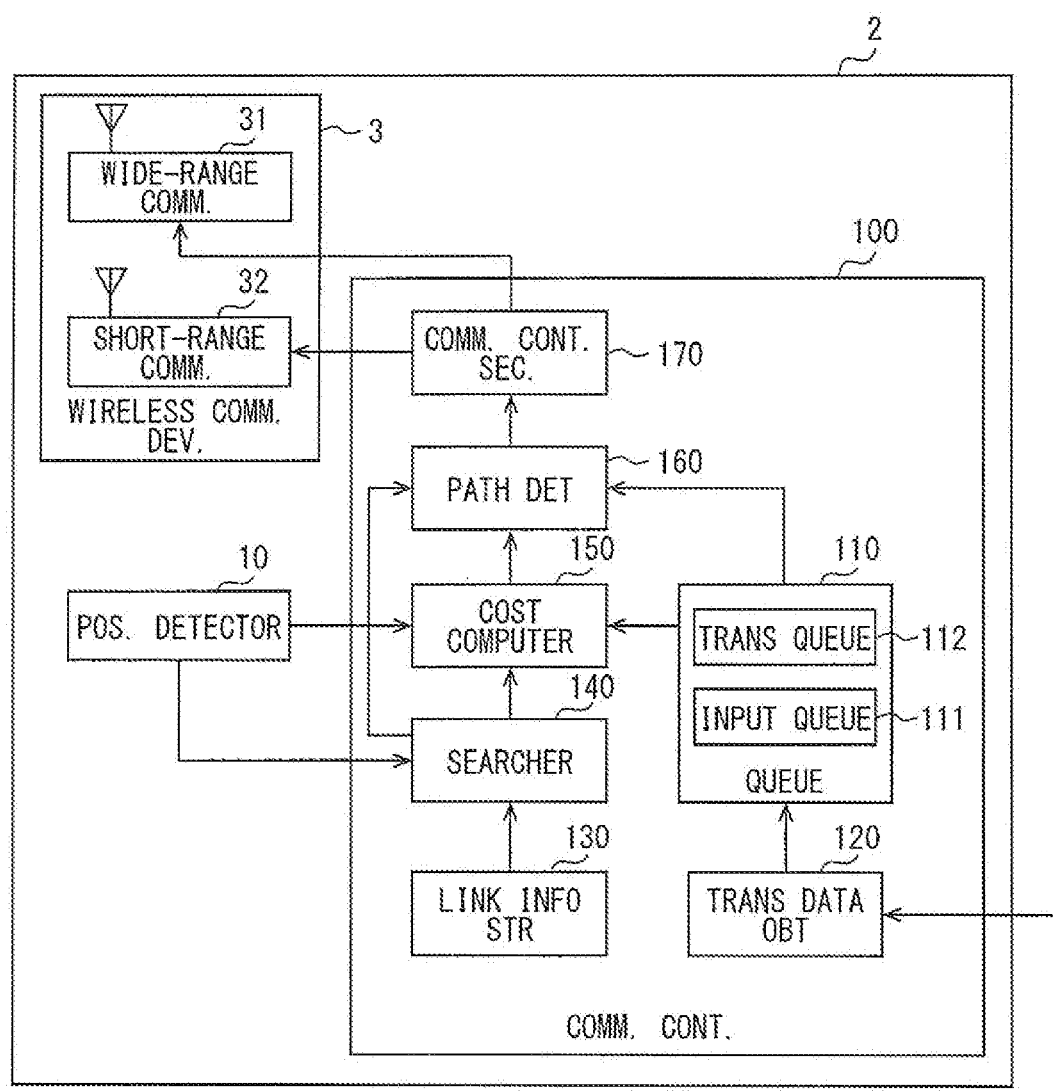
FIG. 2 is a block diagram of a communication controller of the present disclosure.

The configuration of the communication controller 100 is shown in FIG. 2. The vehicle 2 has the wireless communication device 3 and a position detector disposed therein, in addition to the communication controller 100.

The wireless communication device 3 is provided with a wide-range communicator 31 and a short-range communicator 32. The wide-range communicator 31 is a communications section that enables the above-described wide-range wireless communication. The short-range communicator 32 is a communications section that enables the above-described short-range wireless communication.

The position detector 10 is a device that performs sequential detection of the current positions. That is, the position detector 10 may continually detect, or detect at a fixed interval, the current position of the vehicle 2 as the vehicle 2 moves from one position to another. For example, the position detector 10 may include a GNSS receiver that receives a navigation signal transmitted from a navigation satellite equipped with Global Navigation Satellite System (GNSS) to detect the current position of the vehicle 2. Based on the navigation signal received by the GNSS receiver, the position detector 10 performs sequential detection (e.g., detects one position after another) of the current vehicle positions as the vehicle 2 moves from one position to another.

The communication controller 100 may include a computer having a CPU, a RAM, a ROM, one or more I/Os, and a bus line connecting those components and other devices. A program for execution by the communication controller 100 may be stored in a memory such at the ROM. The execution of the program by the communication controller 100 causes the communication controller and the elements of the communication controller 100 to perform the processes and functions included in the instructions of the program. That is, the functions and processes performed by the communication controller 100 and/or the elements of communication controller 100 may be realized by software.

The above-mentioned program may be stored in a non-transitive, substantive storage medium. Such a storage medium may not be limited to a read only memory (ROM), but may also be another device. For example, the above-mentioned program may be stored in a flash memory. Execution of such a program by the CPU corresponds to performing a method implemented by such a program.

Some or all of the functions of the communication controller 100 may also be realized and implemented using hardware. For example, by using one or more integrated circuits (ICs), an application specific integrated circuit (ASIC), field programmable gate array (FPGA), and like circuits. For example, the respective functions performed by elements and components of the communication controller 100 may be realized by a specific hardware circuit configured to perform the functions associated with the elements and components. Further, some or all of the functions of the communication controller 100 may be realized and/or implemented as a combination of (a) the execution of software by the CPU, and (b) hardware components.

The communication controller 100 is provided with a queue 110, a transmission data obtainer 120, a communication link information storage 130, a searcher 140, a cost computer 150, a path determiner 160, and a communication control section 170. As described above, the respective functions performed by the queue 110, the transmission data obtainer 120, the communication link information storage 130, the searcher 140, the cost computer 150, the path determiner 160, and the communication control section 170 can be realized by software, hardware, or a combination of software and hardware. For example, the queue 110, the transmission data obtainer 120, the communication link information storage 130, the searcher 140, the cost computer 150, the path determiner 160, and the communication control section 170 may each be realized by an ASIC or FPGA, that is a specific circuit or hardware configuration, and configured to perform one or more respective functions and/or processes. The functions and processes associated with each of the queue 110, the transmission data obtainer 120, the communication link information storage 130, the searcher 140, the cost computer 150, the path determiner 160, and the communication control section 170 are described in greater detail below. Generally, the communication controller 100 may be configured to perform, as a whole, the functions of each of its elements and components.

The queue 110 is configured to temporarily store the data to be transmitted. The queue 110 is realized by using a partial area of RAM. The queue 110 is provided with an input queue 111 holding data input to the communication controller 100, and a transmission queue 112 holding data for transmission until the data is actually transmitted. Note that the input queue 111 may also be referred to as a data storage.

The transmission data obtainer 120 is configured to obtain data to be transmitted to the target device 9 from other devices disposed in the vehicle 2. The obtained data is saved in the input queue 111 of the queue 110.

The communication link information storage 130 is configured to store communication link information, which is information for establishing a communication link L. The communication link information includes information regarding the wide-range communication area 4 and the short-range communication area 6, in terms of, for example, the size and locations of the communication areas 4 and 6. The communication link information may be updated sequentially via the connection to an external server, that is, piecewise, in a one by one or piece by piece manner.

Further, the communication link information includes information regarding a communication charge R required for establishing a communication link L and performing communications. The communication charge R may be a charge by quantity, e.g., a variable rate system based on a data amount, or may be implemented as a flat rate system without regard to the data amount. The communication link information regarding whether the communications are available and/or charged by: the variable rate, the flat rate, or by a unit data charge of the variable rate, is stored in the communication link information storage 130.

The searcher 140 may be configured to search for transport path information for one or more transport paths Pa for transporting the data between the wireless communication device and the target device. The transport path information may include communication state requirements, which are either of (i) conditions for a communication position, which is the position at which data communication is performed, or (ii) conditions for a communication state, which may effectively restrict the communication position as the communication state may vary according to the communication position of the wireless communication device. The conditions for a communication position of the wireless communication device may include the communication position of the wireless communication device to be satisfied for the communication of data. The conditions for a communication state of the wireless communication device may include variables with regard to the communication state that may need to be satisfied at the communication position of the wireless communication device. Here, variables may include the trade-offs between the communication position and communication state, for example, the communication quality, communication charges, and the like, that may be balanced by setting and adjusting the travel and communication parameters. That is, the communication state requirements for the communication state are variably satisfied depending on the communication position of the wireless communication device.

The cost computer 150 may be configured to compute a transport cost Ct for the transportation of the data between the wireless communication device and the target device for each of the plurality of transport path information searched by the searcher. The transport cost Ct may be computed based on a travel parameter and a communication parameter. The travel parameter may be a parameter regarding a travel of the movable body to a communication position to satisfy the communication state requirements. The communication parameter may be a parameter regarding the communication of the data by the wireless communication device at a communication position that satisfies the communication state requirements.

The path determiner 160 may be configured to determine the transport path information that defines the transport path Pa for transporting the data based on the transport cost Ct computed by the cost computer for each of the plurality of pieces of transport path information.

The communication control section 170 may be configured to control the wireless communication device to communicate the data (e.g., send and receive) based on the communication state requirements included in the transport path information determined by the path determiner.

[Process of the Communication Controller 100]

The processes performed by the searcher 140, the cost computer 150, the path determiner 160, and the communication control section 170 of the communication controller 100 are described with reference to the flowchart shown in FIG. 3. The communication controller 100 performs the process shown in FIG. 3 when the transmission data obtainer 120 obtains data.

Figure 3:
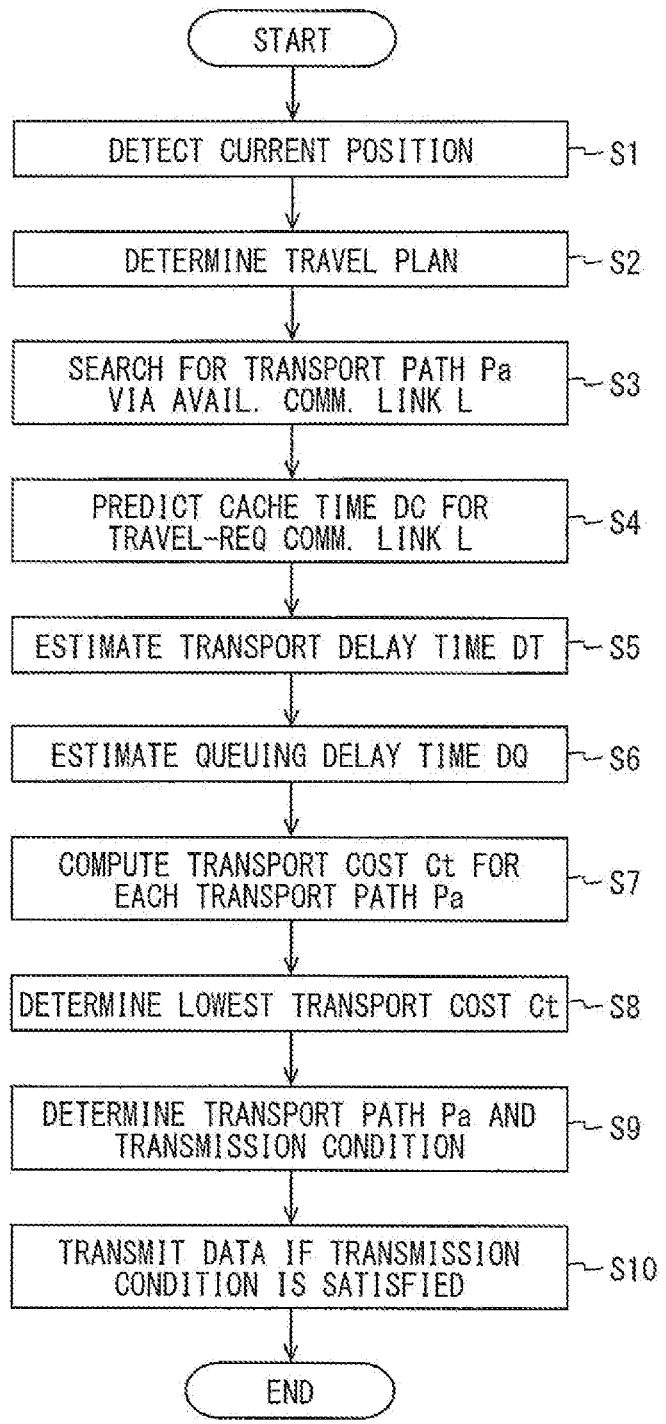
FIG. 3 is a flowchart of a process performed by the communication controller.

At Step S1, the searcher 140 obtains the current position from the position detector 10, shown as "DETECT CURRENT POSITION" in FIG. 3. At S2, the searcher 140 determines the travel plan 5. The travel plan 5 is set as a portion of the guidance route after the current position, when it can be obtained as a guidance route from the navigation device used by the vehicle 2. When the travel plan 5 cannot be obtained as a guidance route, the travel plan 5 may be set as a road shape of a part of the road on which the vehicle 2 is currently traveling, from the current position toward a destination, or along a traveling direction of the vehicle 2. Further, a travel locus of the vehicle 2 that is made up of the current positions sequentially obtained as the vehicle 2 travels, may be extended and adopted as the travel plan 5.

The searcher 140 searches for, at S3, a transport path Pa that utilizes an available communication link L shown as "SEARCH FOR TRANSPORT PATH Pa VIA AVAIL. COMM. LINK L" in FIG. 3. The transport path Pa is a path to transport data to the target device 9. In order to determine an available communication link L, when the vehicle 2 is positioned within the wide-range communication area 4 or the short-range communication area 6 for a certain travel distance and/or travel duration, a search for an available communication link L is made by the searcher 140 based on the travel plan 5 of the vehicle 2 determined at S2, and based on the communication link information stored in the communication link information storage 130.

The certain travel distance and/or travel duration described above may be set in advance based on a permissible transmission delay time. With reference to FIG. 1, the available communication links may be a short-range communication link Ls for short-range wireless communication performable in the short-range communication area 6, and a wide area communication link Lw for wide-range wireless communication performable in the wide-range communication area 4.

Thus, based on a relationship among the wide-range communication area 4, the short-range communication area 6 searched for by the searcher 140, the process determines a transmission start position for starting data transmission. When the current position of the vehicle 2 is contained in the searched communication area, the transmission start position is the current position. For example, when the searched communication area is the wide-range communication area 4 and the vehicle 2 is within the wide-range communication area 4, the transmission start position is the current position of the vehicle 2. On the other hand, when the current position is not contained in the searched communication area, the transmission start position is where the travel plan 5 and the search communication area intersect. Note that the above-described transmission start position defines requirements for the communication position for transmission (e.g., for communication). That is, the transmission start position may be referred to as the communication state requirements. Further, information regarding the entirety of the data transport path from the current position to the target device 9 is the transport path information.

At S4, the cost computer 150 estimates an amount of cache time, that is the travel time from the current vehicle position to the communication area of the available communication link L, when the use of such a link L requires the travel of the vehicle 2. In other words, the cost computer 150 estimates the travel time to the communication area where the communication link L can be established. With reference to the example shown in FIG. 1, the short-range communication link Ls can be established in the short-range communication area 6 such that the communication link L require the vehicle 2 to travel to the short-range communication area 6. The cost computer 150 estimates the cache or travel time of the vehicle 2 to the short-range communication area 6 where the short-range communication link Ls can be established.

Data may be stored in memory or another device until the vehicle 2 arrives at the communication area where the communication link L can be established. As such, the travel time may be considered as a data storage time or holding time, that is, "a cache time DC."

The costs computer 150 may calculate the cache time DC by dividing a travel distance from the current position to the communication area along the route of the travel plan 5 by a travel speed. The travel speed during such travel may be, for example, set as an average travel speed based on the past travels of the vehicle 2 along the route, an average speed of other vehicles traveling in between the current position and the communication area, or the like.

Figure 4:
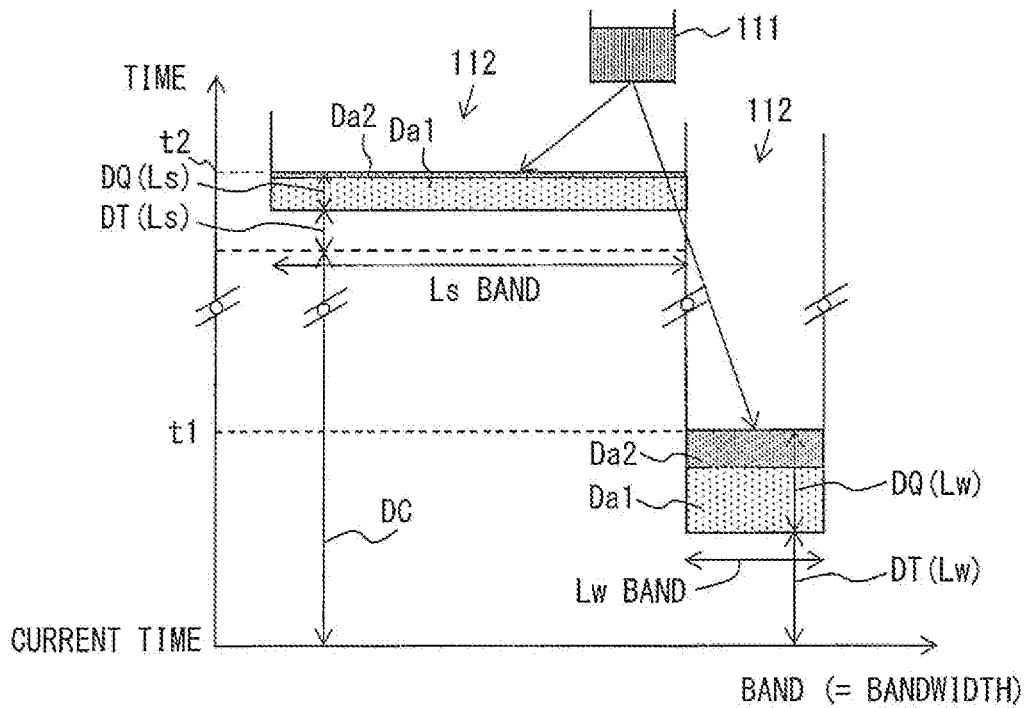
FIG. 4 illustrates a comparison between a data transmission time by a short-range communication link and a data transmission time by a wide-range communication link.

FIG. 4 is a graph that shows both (a) a time from establishing a short-range communication link Ls to a completion of a data transmission, and (b) a time from establishing a wide-range communication link Lw to the completion of a data transmission, both by the wireless communication device 3. The times for establishing the short-range communication link Ls and the wire-range communication link Lw are shown side by side in a comparative manner. FIG. 4 also illustrates an example, as shown in FIG. 1, where the vehicle 2 is currently positioned in the wide-range communication area 4 where a wide-range communication link Lw can be established and traveling along a travel plan 5 toward a short-range communication area 6 where a short-range communication link Ls can be established. In FIG. 4, a horizontal axis is a bandwidth of each of the communication links L (bandwidth is shortened to "BAND" in FIG. 4 and in other drawings). The bandwidth means a communication speed of data transmission, as used in data communication.

As shown in FIG. 4, the short-range communication link Ls has a wider (i.e., longer) sideways length than the wide-range communication link Lw. This means that the short-range communication link Ls has a wider bandwidth than the wide-range communication link Lw. Also, a cache time DC is shown for the short-range communication link Ls, but no cache time DC is shown for the wide-range communication link Lw, because the wide-range communication link Lw can be currently established at the current position of the vehicle 2.

With reference again to FIG. 3, at S5, the cost computer 150 estimates a transmission delay time DT for the communication link L determined by the searcher 140 at S3. The transmission delay time DT is a delay time set based on the type of the communication channel or communications system. Therefore, the delay time DT may be stored in the communication link information storage 130 in advance as the communication link information. Further, when performing S5, the cost computer 150 may obtain the transmission delay time DT from a server via a connection to the server. A transmission delay time DT(Ls) of the short-range communication link Ls and a transmission delay time DT(Lw) of the wide-range communication link Lw are respectively shown in FIG. 4.

At S6, the cost computer 150 estimates a queuing delay time DQ. The queuing delay time DQ is a quotient derived from dividing the total data size by the bandwidth of the communication link L. The total data size may be considered as the sum of (i) written but not yet sent data in the transmission queue 112, and (ii) new data to be written from the input queue 111 to the transmission queue 112.

In FIG. 4, the not yet sent data is shown as Da1 and the new data to be written to the transmission queue 112 is shown as Da2. Even when the same data (Da1 and Da2) is written to the transmission queue 112, that is, the same data for both short-range communication link Ls and the wide-range communication link Lw, a queuing delay time DQ(Ls) of the short-range communication link Ls is shorter than a queuing delay time DQ(Lw) of the wide-range communication link Lw due to the difference of the bandwidth.

The transmission of the data is complete after the lapse of the queuing delay time DQ. For example, as shown in FIG. 4, the data transmission of the wide-range communication link Lw is complete at time t1, and the data transmission of the short-range communication link Ls is complete at time t2.

At S7, the cost computer 150 computes a transport cost Ct for each of the transport paths Pa. The transport cost Ct is a cost to transport data to the target device 9. The data transport means in the present embodiment may be provided either (i) as data transportation using substantive storage media that store data (e.g., moving/transporting the data storage medium with the data), or (ii) as a transmission of data via radio wave. Random access memory (RAM) may be used as the storage media for storing data in the present embodiment.

There are two data transport means as described above. Therefore, the transport cost Ct is computable based on (i) a travel parameter regarding a travel of the movable body (e.g. the vehicle 2) to a data transmission position, and (ii) a communication parameter regarding the data transmission of the wireless communication device 3 at a data transmission position.

The travel parameter in the present embodiment is the cache time DC estimated by the cost computer 150 at S4. The communication parameter in the present embodiment is the transmission delay time DT estimated at S5, the queuing delay time DQ estimated at S6, and the communication charge R to transmit data by establishing a communication link L.

Based on these parameters, the process computes the transport cost Ct by using a transport cost computing function FC, for example, shown below, as equation 1 or equation 2. Note that α in the equation 1 and β in the equation 2 are respectively coefficients that can be set in advance as any value.

$$Ct=FC(DC,DT,DQ,R)=\alpha(DC+DT+DQ)+R \quad \text{(Equation 1)}$$

$$Ct=FC(DC,DT,DQ,R)=\beta(DC+DT+DQ)/R \quad \text{(Equation 2)}$$

The process computes the transport cost Ct by substituting actual values for the cache time DC, the transmission delay time DT, the queuing delay time DQ, and the communication charge R in the transport cost computing function FC, which are set in advance (i.e., can be determined in advance) according to the communication link L, for example, as in equation 1 and equation 2.

Figure 5:
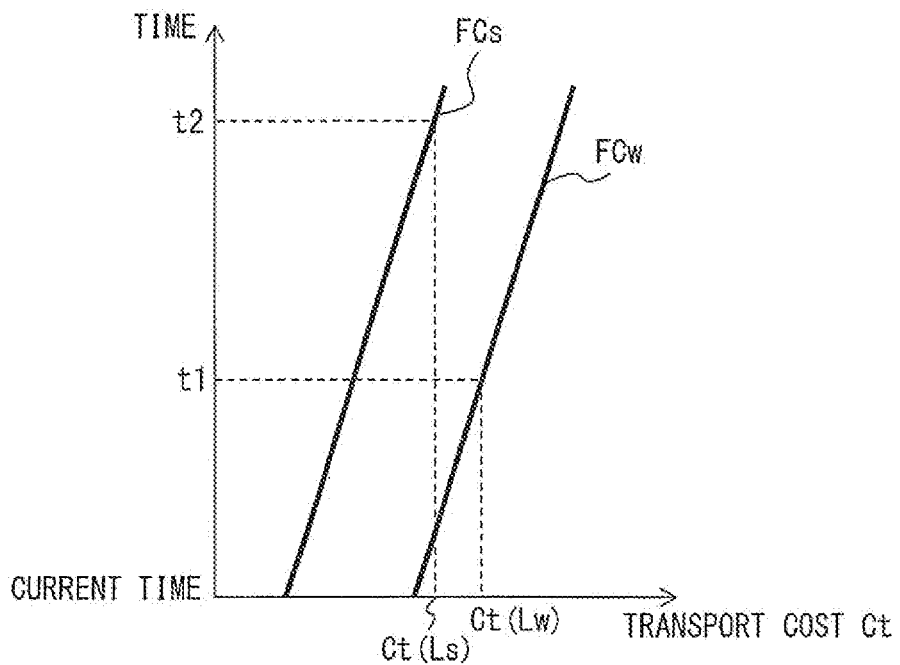
FIG. 5 is a graph illustrating transport cost computing functions.

At S8, the path determiner 160 compares the transport costs Ct computed at S7, and determines a transport path Pa having the lowest transport cost Ct. FIG. 5 shows a transport cost Ct(Ls) of the transport path Pa that transports data by using the short-range communication link Ls, and a transport cost Ct(Lw) of the transport path Pa that transports data by using the wide-range communication link Lw. Note that as shown in FIG. 5, the transport cost computing function FCs is a function that uses the short-range communication link Ls, and the transport cost computing function FCw is a function that uses the wide-range communication link Lw, both of which are computed using equation 1. Time t1 and time t2 in FIG. 5 are the same as times t1 and t2 shown in FIG. 4 and indicate when the data transmission is completed.

As shown in FIG. 5, the completion time t2 for the data transmission of the transport path Pa using the short-range communication link Ls is later than the completion time t1 for the data transmission of the transport path Pa using the wide-range communication link Lw. However, as shown in FIG. 5, the wide-range communication link Lw has a higher communication charge R leading to a higher transport cost Ct(Lw). Therefore, the transport cost Ct(Ls) using the short-range communication link Ls is lower.

At S9, the path determiner 160 determines the lowest-cost transport path Pa determined at S8 as the transport path Pa for the actual transport of data. The path determiner 160 also determines a transmission condition when data is transported via the path Pa, and the data in the input queue 111 is written to the transmission queue 112.

The transport path Pa transmitting data by using the short-range communication link Ls is a path, which holds data in the input queue 111 from the current vehicle position until the vehicle 2 enters the short-range communication area 6, and performs wireless transmission of the data in the short-range communication area 6 to transmit the data to the target device 9 via the access point 8. When the path determiner 160 makes the determination to transmit data by the transport path Pa, the transmission condition may be that the movable body (e.g., vehicle 2) is in the short-range communication area 6.

The determination of whether the vehicle 2 is in the short-range communication area 6 or not may be based on the current position of the vehicle 2, or whether the vehicle 2 has received a beacon that is periodically transmitted by the access point 8. Note that, in instances where the transport path Pa is determined as a path which transmits data by using the wide-range communication link Lw, the transmission condition may be that the vehicle 2 is in the wide-range communication area 4. For example, with reference to FIG. 1, when the transmission condition is that the vehicle 2 is in the wide-range communication area 4, the data is immediately transmittable, because the vehicle 2, as shown, is in the wide-range communication area 4.

At S10, the communication control section 170 determines whether the transmission condition is satisfied, and when the transmission condition is satisfied, the data is written to the transmission queue 112, and wireless transmission of the data is performed.

Summary of the First Embodiment

As described above, in the first embodiment, a transport path Pa to the target device 9 for actually transporting data is determined based on the transport cost Ct. The transport cost computing function FC which computes the transport cost Ct includes not only the communication parameter regarding data transmission, but also the travel parameter regarding the travel of the vehicle 2 to the transmission start position for transmitting data. As such, the communication controller 100 of the present embodiment can determine whether it should immediately transmit data, or if it should hold the data until other communication means become available, in view of the data holding cost(s).

Thus, the transport path Pa of data is determined based on the transport cost Ct not only in consideration of the costs for communication but also in consideration of the costs regarding the travel of the vehicle 2. Therefore, the best (e.g., the most cost-effective) transport path Pa from among the available transport paths Pa for transporting data to the target device 9 may be determined considering the travel of the vehicle 2. In such manner, data transport can be advantageously and cost effectively performed under the control of the communication controller 100.

Second Embodiment

The second embodiment of the present disclosure is described in the following paragraphs.

In the description of the second embodiment, the reference numbers for elements and features described in the first embodiments may be used for like elements and features in the second embodiment. A repeat description of these elements and features may be omitted for brevity.

With reference to FIG. 2, in the second embodiment, the communication controller 100 performs data transmission using the wide-range communicator 31, but without using the short-range communicator 32. For example, with reference to FIG. 1, when the travel plan 5 is used, in instances where the vehicle 2 is predicted to "miss" (e.g., not to be able to reach or enter) the short-range communication area 6 within the permissible transmission delay time, data transmission using the short-range communicator 32 will not be performed. Further, in the second embodiment, the wireless communication device 3 may have a configuration that does not include the short-range communicator 32.

Figure 6:
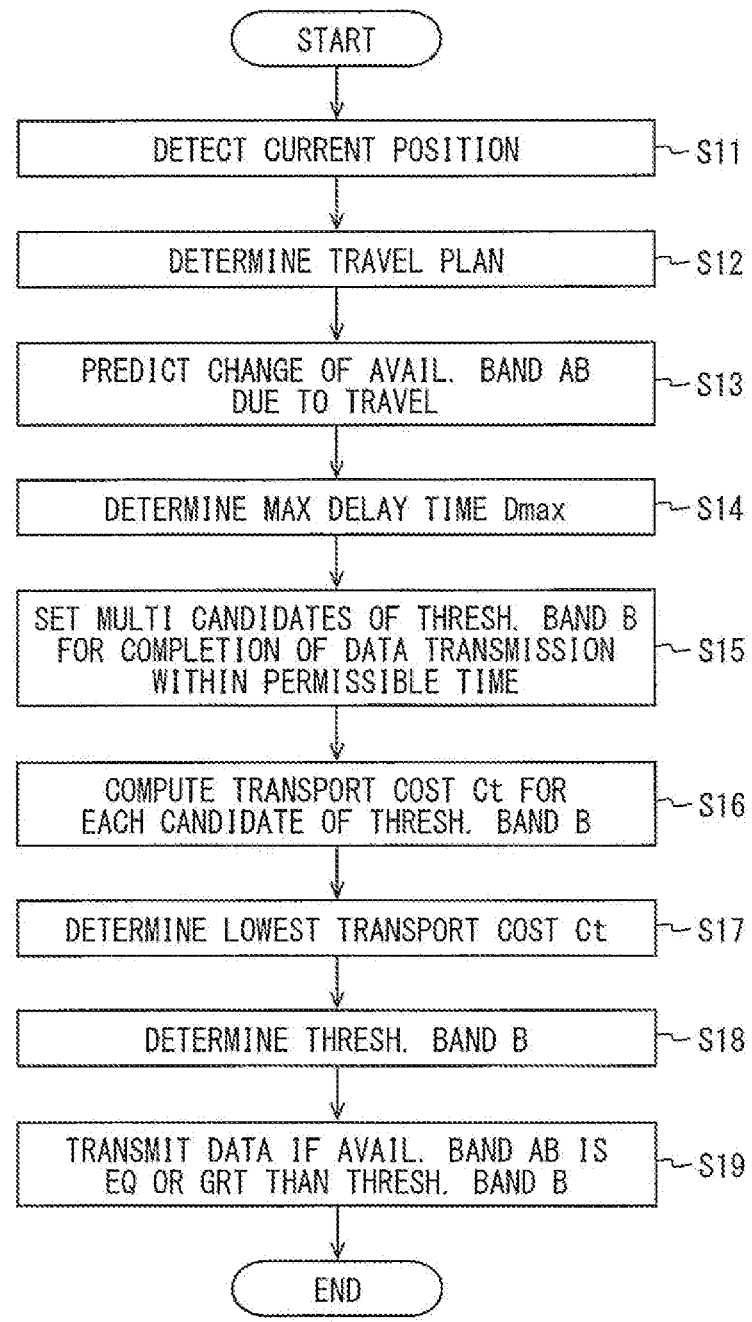
FIG. 6 is a flowchart of a part of a process performed by a communication controller in a second embodiment of the present disclosure.

In the second embodiment, the communication controller 100 may perform the process flow shown in FIG. 6, instead of the process flow shown in FIG. 3. In FIG. 6, S11 and S12 are similar to S1 and S2 in FIG. 3, that is, in S11 the searcher 140 detects the current position of the vehicle 2, and at S12 the searcher 140 determines the travel plan 5 of the vehicle 2.

At S13, the searcher 140 is configured to forecast a change of the available bandwidth AB available to the wide-range communicator 31 based on the travel of the vehicle 2. When the searcher 140 forecasts a change of the available bandwidth AB, the wide-range communicator 31 may perform an adaptive modulation. In the adaptive modulation, the wide-range communicator 31 changes the modulation technique for data transmission based on the change of radio wave environment. Therefore, in the adaptive modulation, frequency utilization efficiency may change. Note that "bandwidth" in the following paragraphs may mean bandwidth or an amount of bandwidth.

The available bandwidth AB is computable by multiplying a resource amount by a frequency utilization efficiency. The resource amount is a size of a frequency band in units of [Hz×s]. The frequency utilization efficiency is in units of [bits/(Hz×s)]. The resource amount is a value assigned to each communication system and is a fixed value. Therefore, a change to the frequency utilization efficiency will correspondingly change the available bandwidth AB. The frequency utilization efficiency may also be influenced by the radio wave environment. In addition, the radio wave environment may change based on one or more geographic factors. Therefore, the frequency utilization efficiency and the available bandwidth AB that changes corresponding to the frequency utilization efficiency may both be set in advance according to the geographic factors, that is, from place to place.

Figure 7:
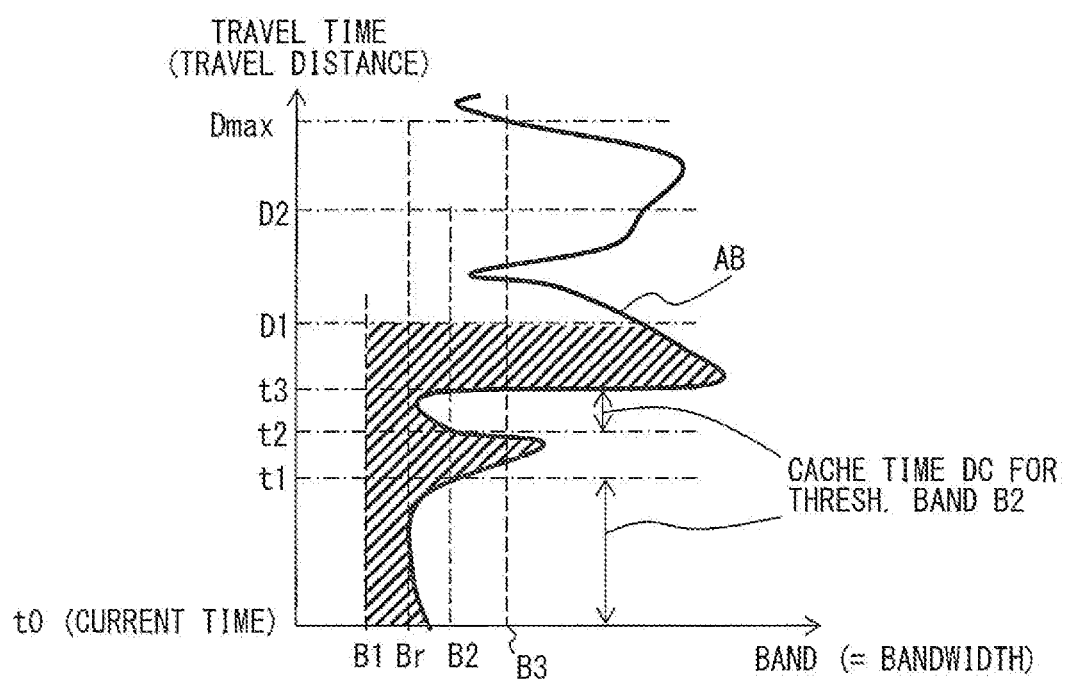
FIG. 7 illustrates a change of available bandwidth according to a distance from a current position.

At S13, the searcher 140 forecasts a change of the available bandwidth AB associated with a future travel of the vehicle 2 based on (i) the relationship set up in advance regarding the location-specific amount of available bandwidth AB, and (ii) the travel plan 5 of the vehicle 2. FIG. 7 shows a graph illustrating the change of the available bandwidth AB according to the travel distance from the current position. Note that the vertical axis of the graph in FIG. 7 may be considered either as the travel distance or the travel time, since the travel time can be computed if the travel speed is known.

At S14, the searcher 140 determines a permissible maximum time Dmax of the transmission delay time (i.e., "a maximum delay time Dmax"). The maximum delay time Dmax may have a fixed value without regard to the data type, or may have a value set according to each of the data types. When the maximum delay time Dmax is set for each data type, the searcher 140 determines the maximum delay time Dmax based on the data type to be transmitted.

At S15, the searcher 140 determines and sets threshold bandwidth B candidates that can complete the data transmission at or before the maximum delay time Dmax determined at S14, shown as "FOR COMPLETION OF DATA TRANSMISSION WITHIN PERMISSIBLE TIME" at S15 in FIG. 7. Note that the threshold bandwidth B is a "threshold bandwidth value" in comparison to a bandwidth value of the available bandwidth AB. That is, when the available bandwidth AB is "wider" than the threshold bandwidth B, the process permits data transmission. In such case, the transmission bandwidth used for data transmission is computable as a difference, e.g., the available bandwidth AB—the threshold bandwidth B. Data will be transmitted at positions where the transmission bandwidth computed above is greater than zero. That is, the communication state requirements are defined as a transmission/communication so bandwidth being greater than zero.

Threshold bandwidths B1. Br, B2, and B3 are illustrated in FIG. 7. A boundary of the available bandwidth AB is shown as a thick-curved line on the right side of FIG. 7. The boundaries for the transmission bandwidths are shown as broken lines for each of the threshold bandwidths B1, Br, B2, and B3.

The wider a threshold bandwidth B becomes, the narrower the transmission bandwidth and the longer the delay time D. The threshold bandwidth B3 is a threshold bandwidth B where the delay time D is set as the maximum delay time Dmax. Therefore, at S15, the searcher 140 determines and sets the threshold bandwidth B that is equal to or less than the threshold bandwidth B3 as a threshold bandwidth B candidate for actual data transmission.

The threshold bandwidth B candidates may include a bandwidth having the width of the bandwidth B3, as well as narrower bandwidths that may have widths that vary relative to one another by a preset amount. For example, the bandwidth values of the bandwidths B3 to B1 may decrease stepwise by a preset amount. The lower limit bandwidth of the candidate may be 0 (zero), or may be a value greater than 0 (zero).

Since the transmission bandwidth is calculated as a difference, e.g., by subtracting the threshold bandwidth B from the available bandwidth AB, an amount of data transmission decreases as the available bandwidth AB becomes narrower, and is especially true when the threshold bandwidth B is wider. The available bandwidth AB is, as described above, defined as the product of the resource amount multiplied by the frequency utilization efficiency. A narrow available bandwidth AB means a low frequency utilization efficiency.

Therefore, no data transmission when an available bandwidth is narrow is equivalent to no data transmission when a frequency utilization efficiency is low. In other words, the wider the threshold bandwidth B, the higher the frequency utilization efficiency of the data transmission.

At S16, the cost computer 150 computes the transport cost Ct for each candidate of the threshold bandwidths B set up by the searcher 140 at S15. The cost computer 150 computes the transport cost Ct in the second embodiment with the transport cost computing function FC shown in equation 3.

$$Ct = FC(DC, Ef) = \Sigma_{(data)} \{f1(DC) + f2(Ef)\} \quad \text{(Equation 3)}$$

The function f1 (DC) is a function that has the cache time DC as the travel parameter, and the value of function f1(DC) is configured to become large, when the cache time DC is long. For example, the function f1(DC) may be configured to have a greater value in proportion to the cache time DC.

In FIG. 7, during the time from t1 to t2 and after time t3, the available bandwidth AB exceeds the threshold bandwidth B2. In other words, the times from t0 to t1 and from time t2 to t3 are respectively the cache time DC. As such, the cache time DC becomes longer when the threshold bandwidth B becomes wider.

In the first embodiment, the transmission delay time DT and the queuing delay time DQ are used as a time parameter in addition to the cache time DC. Thus, the function f1 may also be configured as a function using the transmission delay time DT and the queuing delay time DQ as parameters in addition to the cache time DC. However, the second embodiment determines in which time range the data transmission is performed in a single communication system, instead of determining which of the two or more communication systems to use for data transmission. In view of such an assumption, and based on a knowledge that the transmission delay time DT is always the same in a single communication system, this indicates that the data transmission time (i.e., time required for data transmission) will not significantly change regardless of whether the transmission delay time DT is taken into consideration. Therefore, the cost computer 150 computes the transport cost Ct in the second embodiment without taking the transmission delay time DT into consideration.

The queuing delay time DQ may also not be taken into consideration in computing the transport cost Ct for the following reasons. In the present embodiment, the threshold bandwidth is a remaining bandwidth during data transmission. The remaining bandwidth has a value (i.e., a bandwidth value) which is computed by subtracting the transmission bandwidth from the available bandwidth. For setting the remaining bandwidth as a threshold bandwidth, traffic shaping (e.g., packet shaping) and like active queue management (AQM) may be used to maintain the transmission bandwidth as a difference between the available bandwidth and the threshold bandwidth. As a result, when the threshold bandwidth is wider than the available bandwidth, the transmission bandwidth is set to zero. When the transmission bandwidth is zero, data will not be written to the transmission queue 112. As a result of the above process, the queuing delay time DQ becomes zero. Therefore, the queuing delay time DQ will not be taken into consideration.

Note that, in FIG. 7, the threshold bandwidth Br is a minimum threshold bandwidth that always makes the available bandwidth wider than the threshold bandwidth. The threshold bandwidth B2 is an example of the threshold bandwidth B between the threshold bandwidth Br and the threshold bandwidth B3, and the threshold bandwidth B1 is an example of the threshold bandwidth B narrower than the threshold bandwidth Br. Since the threshold bandwidth B1 is always narrower than the available bandwidth AB, whenever the threshold bandwidth B1 is set as the threshold bandwidth B, the threshold bandwidth B1 is always settable as a remaining bandwidth.

The time D1 is a forecast time, i.e., estimation, of when the data transmission will be complete when the threshold bandwidth B1 is used, and the time D2 forecasts when data transmission will be complete when the threshold bandwidth B2 is used.

The function f2(Ef) in equation 3 is a function that uses a communication-resources utilization rate Ef as a parameter. In the second embodiment, the communication-resources utilization rate Ef is a communication parameter. The communication-resources utilization rate Ef may be computed as the transmission bandwidth divided by the available bandwidth AB, i.e. transmission bandwidth/available bandwidth AB. That is, the communication-resources utilization rate Ef shows a rate of the transmission bandwidth relative to the available bandwidth AB. The function f2 is a function that has a smaller value when the communication-resources utilization rate Ef has a greater value. Such a function may be arbitrarily set. For example, the function f2 (Ef) may be configured as a function that has a smaller value in proportion to the communication-resources utilization rate Ef.

The cache time DC and the communication-resources utilization rate Ef may change based on the travel distance or the travel time of the vehicle 2, for example, as shown in FIG. 7. Therefore, the cache time DC and the communication-resources utilization rate Ef are both different data. Therefore, the equation 3 computes the functions f1 and f2 for each data, and computes the sum total as the transport cost Ct. Note that, even though the unit of data transmission amount may be arbitrarily set, it is preferable that the unit of data transmission amount may be a data amount that is transmittable per unit time or less than that.

At S17, the path determiner 160 compares two or more transfer costs Ct computed by the cost computer 150 at 816, and determines a lowest transport cost Ct among them. At S18, the path determiner 160 determines the threshold bandwidth B having the lowest transport cost Ct determined at S17 as the threshold bandwidth B to be used for data transmission. In such manner, the transport path Pa of data is determined.

For example, when the threshold bandwidth B2 is set as the threshold bandwidth B which is actually used for data transmission, data may be held in the input queue 111 until time t1, which corresponds to a position P1. Then, the data held in the input queue 111 is transmitted during period from time t1 to t2, where t2 corresponds to a position P2. In other words, data is transmitted starting at position P1 before reaching position P2. The data transmitted during travel from position P1 to a position at or before position P2 takes the transport path Pa of wireless communication from a transmission position to the target device 9. The data that has not yet been transmitted before arriving at position P2 takes the transport path Pa of wireless communication from a transmission position to the target device 9 by being held in the input queue 111 during a travel up to time t3, which corresponds to a position P3. After reaching position P3, i.e., after time t3, the data is transmitted to the target device 9 sequentially, that is piecewise in a one by one or piece by piece manner.

Note that, as mentioned above, the communication state requirement is that a transmission bandwidth is wider/greater than zero. Further, the information about the entire path of data transport from the current position to the target device 9 is the transport path information.

At S19, the communication control section 170 computes a transmission bandwidth as a difference between the available bandwidth AB and the threshold bandwidth B, and transmits data if the transmission bandwidth is wider than zero by sequentially determining the available bandwidth AB. The communication control section 170 performs process S19 during travel of the vehicle 2.

Summary of the Second Embodiment

The transfer cost computing function FC in the second embodiment, as shown in equation 3, computes the transport cost Ct by using parameters, e.g., the cache time DC as a travel parameter and the communication-resources utilization rate Ef as a communication parameter. That is, just like the first embodiment, in consideration of the travel of the vehicle 2, the most advantageous transport path Pa is determined from among the transport paths Pa, which are respectively capable of transporting data to the target device 9. Therefore, data transportation may be advantageously performed by the communication controller of the present disclosure.

Third Embodiment

Figure 8:
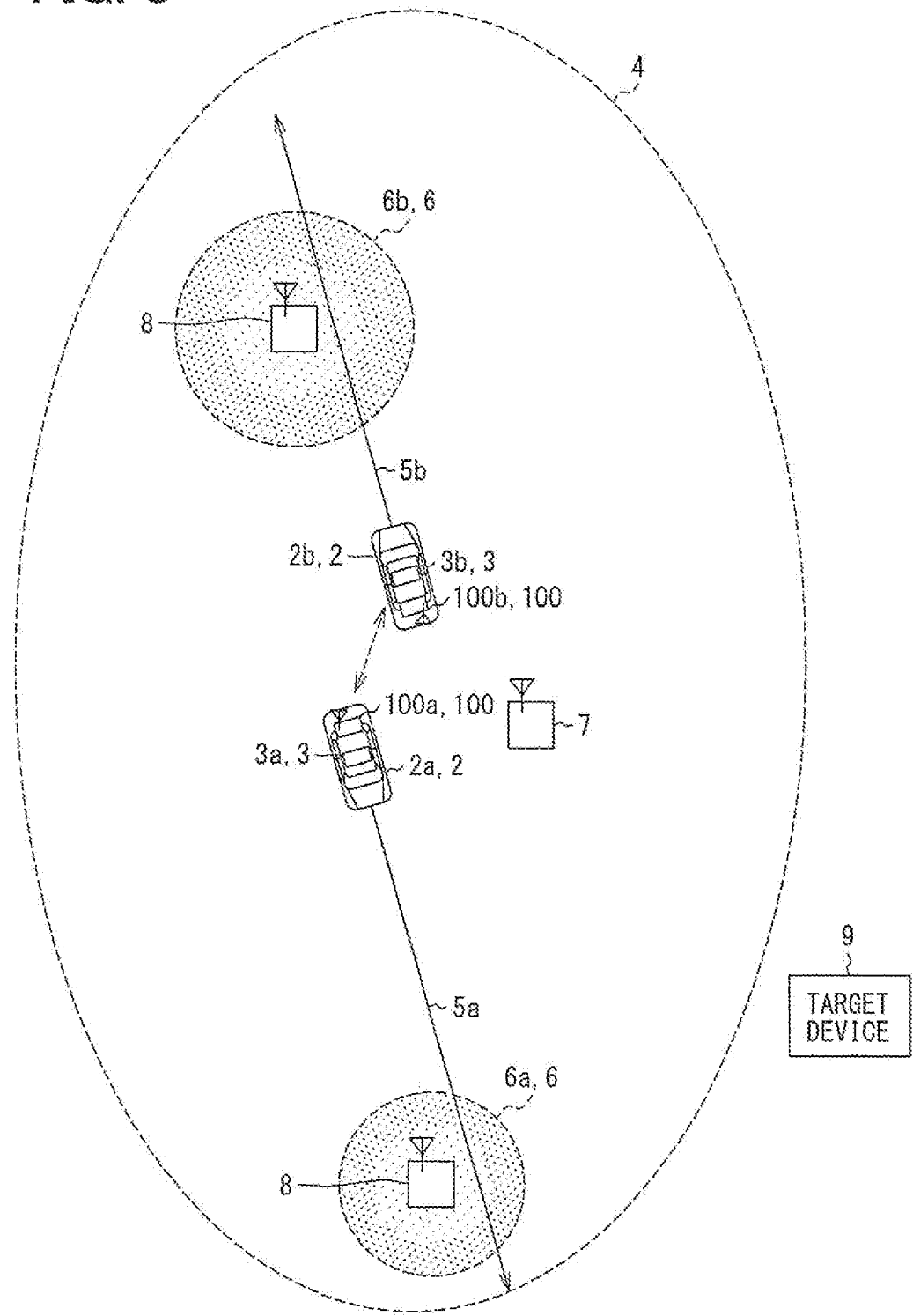
FIG. 8 illustrates a process performed by a communication controller in a third embodiment of the present disclosure.

An operation of the communication controller 100 in the third embodiment is described with reference to FIG. 8. Two vehicles, a vehicle 2a and a vehicle 2b, are shown in FIG. 8. Both of the vehicles 2a, 2b include the wireless communication device 3 and the communication controller 100. More specifically, the wireless communication device 3 and the communication controller 100 in the vehicle 2a are designated as a wireless communication device 3a and a communication controller 100a, and the wireless communication device 3 and the communication controller 100 in the vehicle 2b are more designated as a wireless communication device 3b and a communication controller 100b. Note that the position of the vehicle 2a and a travel plan 5a of the vehicle 2a are the same as the position of the vehicle 2 and the travel plan 5 of the vehicle 2 shown in FIG. 1.

The wireless communication devices 3a and 3b respectively search periodically for a relay path, and respectively transmit relay path information which shows a relay path from the short-range communicator 32, e.g., the short-range communicator 32 as shown in FIG. 2. Such transmission of the relay path information may be performed as broadcasting. However, such transmission may also be a unicast transmission or a multicast transmission. The short-range communicator 32 can receive the relay path information transmitted from another nearby vehicle or device.

The relay path is the same as the transport path Pa described in the first embodiment except for the capability of receiving data from another nearby vehicle 2 or device, with such capability referred to as receiving "data from the outside" (e.g., from another vehicle or device). The relay path is a path for receiving data from the outside and for relaying and transporting data to the target device 9 as the name "relay path" suggests.

In the first embodiment, the transport path Pa is described as a path that transmits data by using the wide-range communication link Lw and a path that transmits data by using the short-range communication link Ls. Therefore, the relay path may also be a path that transmits data by using the wide-range communication link Lw and a path that transmits data by using the short-range communication link Ls.

For example, assuming a situation where the wireless communication device 3b transmits the relay path information, the relay path information is received by the short-range communicator 32 of the wireless communication device 3a disposed in the vehicle 2a. In addition to the two transport paths Pa described in the first embodiment, the communication controller 100a searches for a transport path Pa which includes the relay path provided by the device 3b, and computes the transport cost Ct of each of the searched transport paths Pa. Then, data transmission is performed via the transport path Pa having the lowest transport cost Ct. In the above-described example, the vehicle 2a is a first movable body. The vehicle 2b is a movable body which moves independently from the vehicle 2a, and corresponds to a second movable body. Moving independently or independent movement of the vehicle 2b from the vehicle 2a means that the vehicle 2a puts absolutely no restriction on the movement/travel of the vehicle 2b. More descriptively, the vehicle 2b is not traveling in response to an instruction from the vehicle 2a, but is traveling on its own travel path by determining the path by itself.

The transport path Pa having the lowest transport cost Ct which is determined by the communication controller 100a in the vehicle 2a is assumed as a transport path Pa which may be by way of the wireless communication device 3b disposed in the vehicle 2b. In such case, the communication controller 100a disposed in the vehicle 2a transmits data to the wireless communication device 3b. The wireless communication device 3b transmits the received data to the target device 9. In such example, the wireless communication device 3b serves as a movable relay device.

Figure 9:
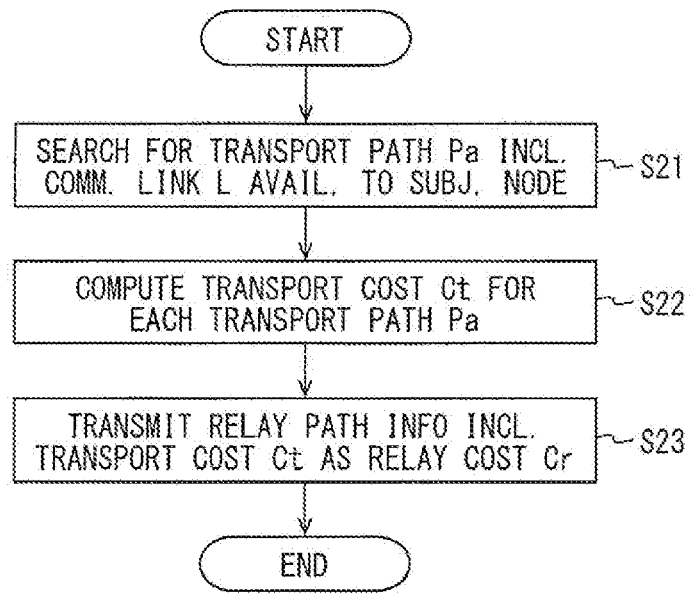
FIG. 9 is a flowchart of a process periodically performed by the communication controller in the third embodiment of the present disclosure.

Hereafter, an operation of the communication controller 100 in the third embodiment is described in detail. FIG. 9 shows a process that is performed periodically by the communication controller 100 in the third embodiment. At S21, a subject node searches for the transport path Pa including an available communication link L. A subject node in this case means the communication controller 100 performing the present process. Process of S21 is similar to the process S4 in FIG. 3. As such, the process of S21 may be performed by the cost computer S150 of the communication controller 100.

At S22, the cost computer 150 computes the transport cost Ct for each of the searched transport paths Pa searched at S21. The process at S22 is similar to the processes performed at S4-S7 in FIG. 3.

Figure 10:
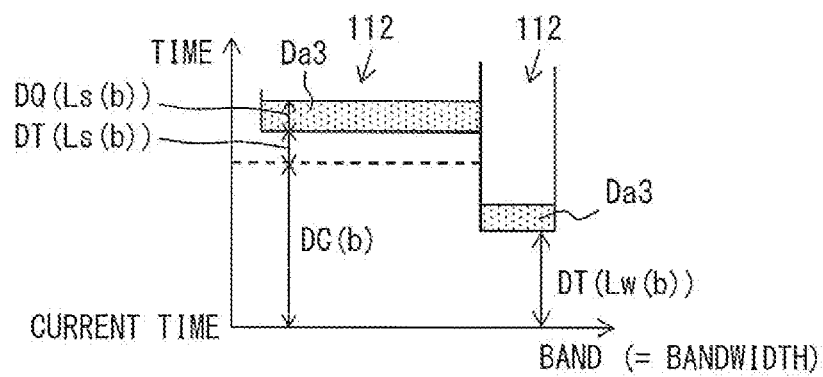
FIG. 10 illustrates a travel parameter when a step of the process of FIG. 9 is performed.

FIG. 10 shows a travel parameter at the time of performing S22, for example, using the communication controller 100b. In FIG. 10, the cache time DC(b) is a time required for the vehicle 2b carrying the communication controller 100b to arrive at the short-range communication area 6b by travelling according to a travel plan 5b. The transmission delay time DT(Ls(b)) is a transmission delay time DT of the short-range communication link Ls(b), which is established in the short-range communication area 6b. The queuing delay time DQ(Ls(b)) is a queuing delay time DQ of the data transmission from the short-range communicator 32 in the wireless communication device 3b, at a current moment.

The data Da3 is data that has not yet been transmitted, that is, not-yet-transmitted data. The transmission delay time DT(Lw(b)) is a transmission delay time DT of the wide-range communication link Lw(b), which is established in the wide-range communication area 4 by the wide-range communicator 31 in the wireless communication device 3b.

At S23, by setting the transport cost Ct computed at S22 as a relay cost Cr, the relay path information including the relay cost Cr is transmitted, e.g., to the nearby device, from the short-range communicator 32 of the wireless communication device 3. The relay path information includes, other than the relay cost Cr, an ID of the wireless communication device 3 and the position of the wireless communication device 3. The relay path information may also include a travel direction and a travel speed of the device 3 and/or the vehicle 2. Further, the relay path information may also include information indicating a relay path.

Figure 11:
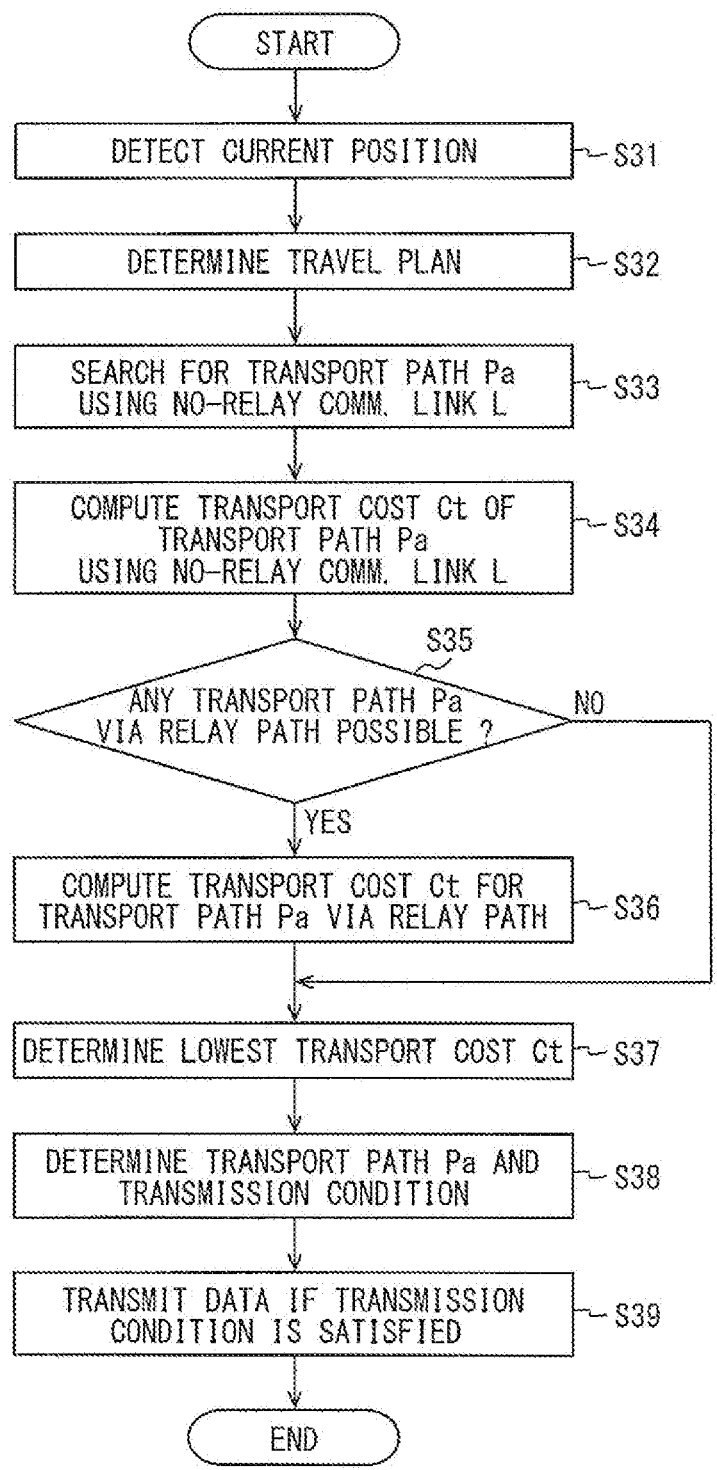
FIG. 11 is a flowchart of a part of the process performed by the communication controller in the third embodiment of the present disclosure.

Next, in the third embodiment, a process performed by the communication controller 100 after the transmission data obtainer 120 obtains data is described with reference to FIG. 11. S31 and S32 in FIG. 11 are similar to S1 and S2 in FIG. 3, i.e., detect the current position at S31, and determine the travel plan 5 at S32. As such, S31 and S32 may be performed by the searcher 140 of the communication controller 140.

At S33, the searcher 140 searches for the transport path Pa that uses a no-relay communication link L. The process at S33 is similar to S3 in FIG. 3. With reference again to FIG. 8, examples of a no-relay communication link L may be the wide-range communication link Lw, and the short-range communication link Ls that is established in the short-range communication area 6a.

At S34, the cost computer 150 computes the transport cost Ct for the transport path Pa which is searched for by the searcher 140 at S33. The process at S34 is the same as processes performed at S4-S7 in FIG. 3.

At S35, the searcher 140 determines whether the transport path Pa that includes a relay path is a possible/feasible transport path. More practically, the searcher 140 determines whether data is transmittable to the wireless communication device 3 disposed in another vehicle 2 by a direct communication that uses the short-range communicator 32. If the distance between the short-range communicator 32 on a transmitting side and the short-range communicator 32 on a receiving side is equal to or less than the maximum communicable distance during the direct communication, it is determined that the transport path Pa including the relay path is a possible and feasible transport path Pa.

While performing the direct communication, whether or not the distance between the short-range communicator 32 on a transmitting side and the short-range communicator 32 on a receiving side is equal to or less than the maximum communicable distance is determined based on the relay path information received from the wireless communication device 3 disposed in the other vehicle 2. A communication distance between the two short-range communicators 32 is determinable because the relay path information includes a position of the wireless communication device 3.

The communication distance changes according to the positions of each of the vehicles 2 on the transmitting side and the receiving side. If the communication distance is maintained to be equal to or less than the maximum communicable distance during the data transmission, it is determined that the transport path Pa including a relay path may be possible/feasible for use as the transport path Pa. To estimate a future position of the vehicle 2 on the receiving side, the predicted future position of the receiving vehicle 2 is based on the travel direction and the travel speed of the receiving vehicle 2, which are included in periodic position updates of the receiving vehicle 2 in the relay path information. Alternatively, changes of the positions of the vehicle 2 on the receiving side may be estimated based on the travel plan 5 transmitted from the vehicle 2 on the receiving side.

If a transport path Pa including a relay path is possible and/or feasible as the transport path Pa, the transport path information defining such a transport path Pa is determined. Further, when the searcher 140 determines that it is possible/feasible to use the relay path as the transport path Pa, i.e., "YES" as S35, the process proceeds to S36. The transport path information described above includes a transmission start position at which data transmission from the short-range communicator 32 is started. A transmission start position corresponds to the communication state requirement. The transmission start position may be, for example, a current position of the vehicle 2 and/or the communication device 3. When the vehicles 2a and 2b are moving closer to each other, the positions of the vehicles 2a and 2b at which the vehicles 2a and 2b become communicable may be the transmission start positions.

At S36, the cost computer 150 computes the transport cost Ct of the transport path Pa including the relay path. The transport cost Ct in such case is a sum of (i) the relay cost Cr included in the relay path information and (ii) the cost of data transmission from the short-range communicator 32 in one vehicle to the short-range communicator in another vehicle. For example, the short-range communicator 32 controlled by the communication controller 100a in the vehicle 2a, which is performing the present process, to the short-range communicator 32 in the vehicle 2b that serves as a movable relay device.

Therefore, regarding the transport cost Ct of the transport path Pa including a relay path, a partial cost of a relay path part is computed as the relay cost Cr. The latter part cost corresponding to the above-described (ii) is computed by using the same transport cost computing function FC as the first embodiment, by utilizing the transmission delay time DT(Ls (ab)) at the time of data transmission between the short-range communicators 32 (e.g., in the vehicles 2a and 2b) as the travel parameter.

Figure 12:
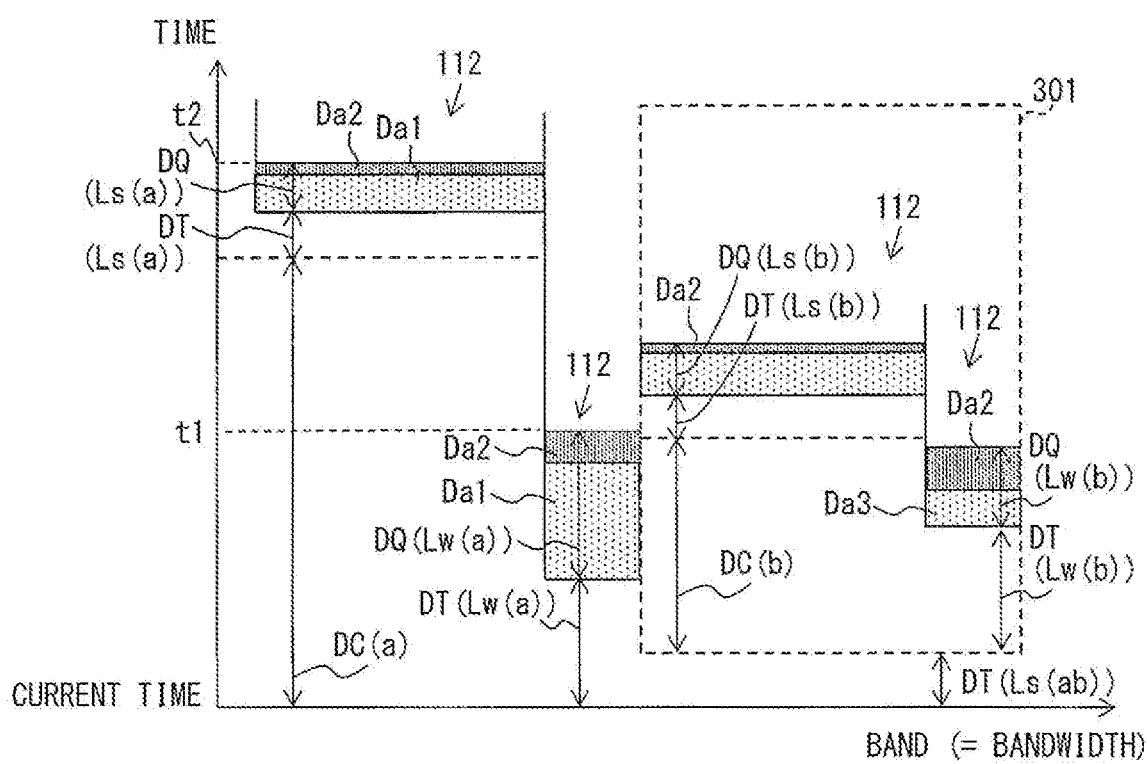
FIG. 12 illustrates a comparison of travel parameters for a transport path including a relay path and a transport path not including a relay path.

As shown in FIG. 12, a comparison between a travel parameter of the transport path Pa that includes a relay path and a travel parameter of the transport path Pa that does not include a relay path is illustrated. The relay path portion 301 shown in FIG. 12 may be similar to the relay path portion shown in FIG. 10, except that FIG. 12 includes the data Da2 transmitted to the transmission queue 112 from the vehicle 2a.

The relay path portion 301 is a time range where the data is "in" a relay path. In other words, the relay path portion 301 is a period of time during which data communication via the relay path may be possible/feasible and the data may be communicated via the relay path. FIG. 12 assumes that the movable relay device is the wireless communication device 3b. In FIG. 12, short-range communication link Ls and the wide-range communication link Lw Illustrated to the left of relay path portion 301 are similar to those shown in FIG. 4, except that the reference characters, e.g., Ls(a), Lw(a), DC(a), include an "(a)" designation to indicate time spent in the wireless communication device 3a or in the communication controller 100a.

The example illustrated in FIG. 12 also assumes that the communication controller 100a can transmit data to the target device 9 in a shorter time by transmitting data by way of a relay path, i.e., the wireless communication device 3b, than directly transmitting data to the base station 7 or to the access point 8 from the wireless communication device 3a.

With reference again to FIG. 11, when the searcher 140 determines that it is not possible/feasible to use the relay path as the transport path, i.e., "NO" at S35, the process proceeds to S37. The process also proceeds to S37 after the process at S36 is performed. At S37, the path determiner 160 compares the transport costs Ct computed respectively at S34 and S36, and determines the transport path Pa having the lowest transport cost Ct.

The processes at S38 and S39 in FIG. 11 are respectively the same as processes S9 and S10 in FIG. 3. At S38, the path determiner 160 determines the transport path Pa that actually transmits data and the transmission condition at the time of data transmission by using the determined transport path Pa. At S39, when it is determined that the transmission condition is satisfied, data in the input queue 111 is written to the transmission queue 112, and the communication control section 170 performs the wireless transmission of data.

The travel parameter in the third embodiment is the cache time DC, and the communication parameter in the third embodiment is the transmission delay time DT, the queuing delay time DQ, and the communication charge R. In the third embodiment, the transmission delay time DT includes the transmission delay time DT(Ls (ab)) between the short-range communicators 32 (e.g., in the vehicles 2a and 2b).

In the third embodiment, the wireless communication device 3 also provides a function as a movable relay device, to relay data transmitted from another wireless communication device 3. Further, when a possible/feasible relaying transport path Pa is determined that includes a relaying wireless communication device 3 disposed in a vehicle (e.g., the vehicle 2b) other than the subject vehicle (e.g. that vehicle 2a) having the subject communication controller 100, the subject communication controller 100 also computes the transport cost Ct for such a relaying transport path Pa. Then, the data transmission is performed by using the transport path Pa having the lowest transport cost Ct. As such, data transportation may be advantageously performed by the communication controller 100 of the present disclosure.

Fourth Embodiment

Figure 13:
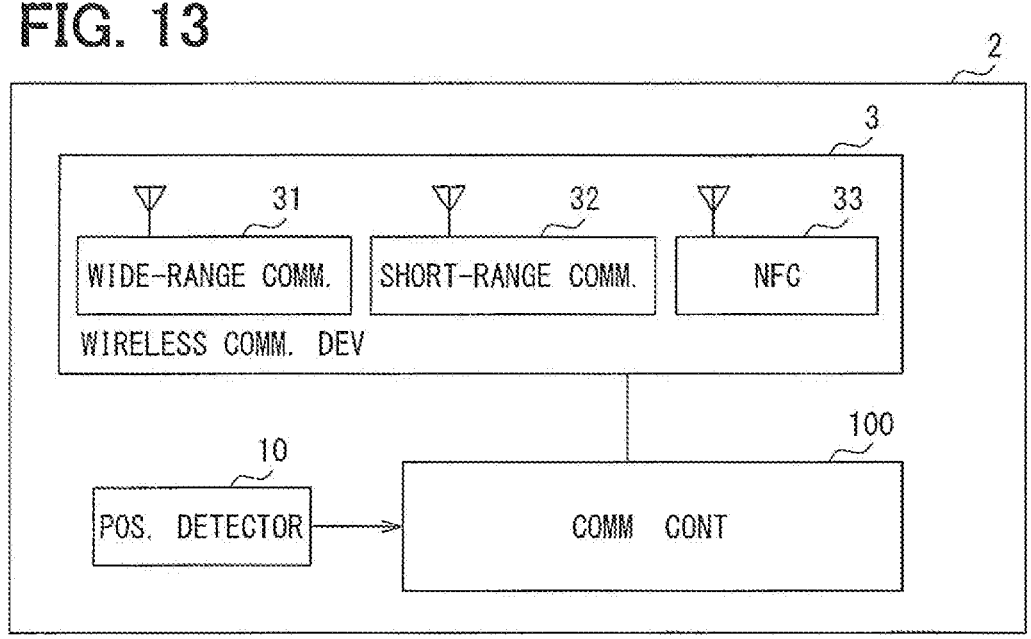
FIG. 13 is a block diagram of in-vehicle elements disposed in a vehicle in a fourth embodiment of the present disclosure.

As shown in FIG. 13, a wireless communication device 3 in the vehicle 2 of the fourth embodiment may include a near-field communicator 33 in addition to the wide-range communicator 31 and the short-range communicator 32, the wireless communication device 3 is provided with a near-field. The near-field communicator 33 performs proximity communication or near-field communication (NFC). The near-field communicator 33 may also be abbreviated to NFC 33.

An operation of the communication controller 100 in the fourth embodiment is described with reference to FIG. 14. In the fourth embodiment, an unmanned flight device 20 is carried with or on the vehicle 2, in addition to the communication controller 100 and the wireless communication device 3 having the near-field communicator 33. The unmanned flight device 20 may be, for example, a multirotor, multicopter aircraft such as a "drone." For example, the unmanned flight device 20 may be a quadcopter drone that is lifted and propelled by four rotors.

Figure 15:
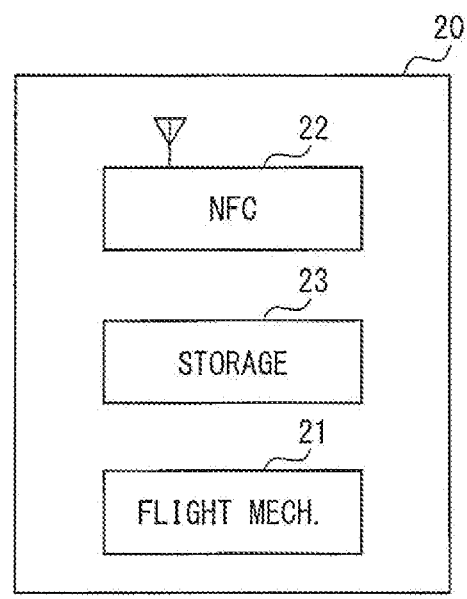
FIG. 15 illustrates a configuration of an unmanned flight device.

The unmanned flight device 20 is, as shown in FIG. 15, provided with a flight mechanism 21, a near-field communicator 22, and a data storage device 23 that may be referred to simply as a data storage. The unmanned flight device 20 flies automatically or by remote control to an instructed destination. The flight mechanism 21 is a mechanism for flying the unmanned flight device 20, which is provided with, for example, a motor as a source of propulsion force and one or more propellers/rotors driven by the motor. The near-field communicator 22 is a communication section performing NFC. The storage 23 stores data transmitted and received by the near-field communicator or NFC 22.

Figure 14:
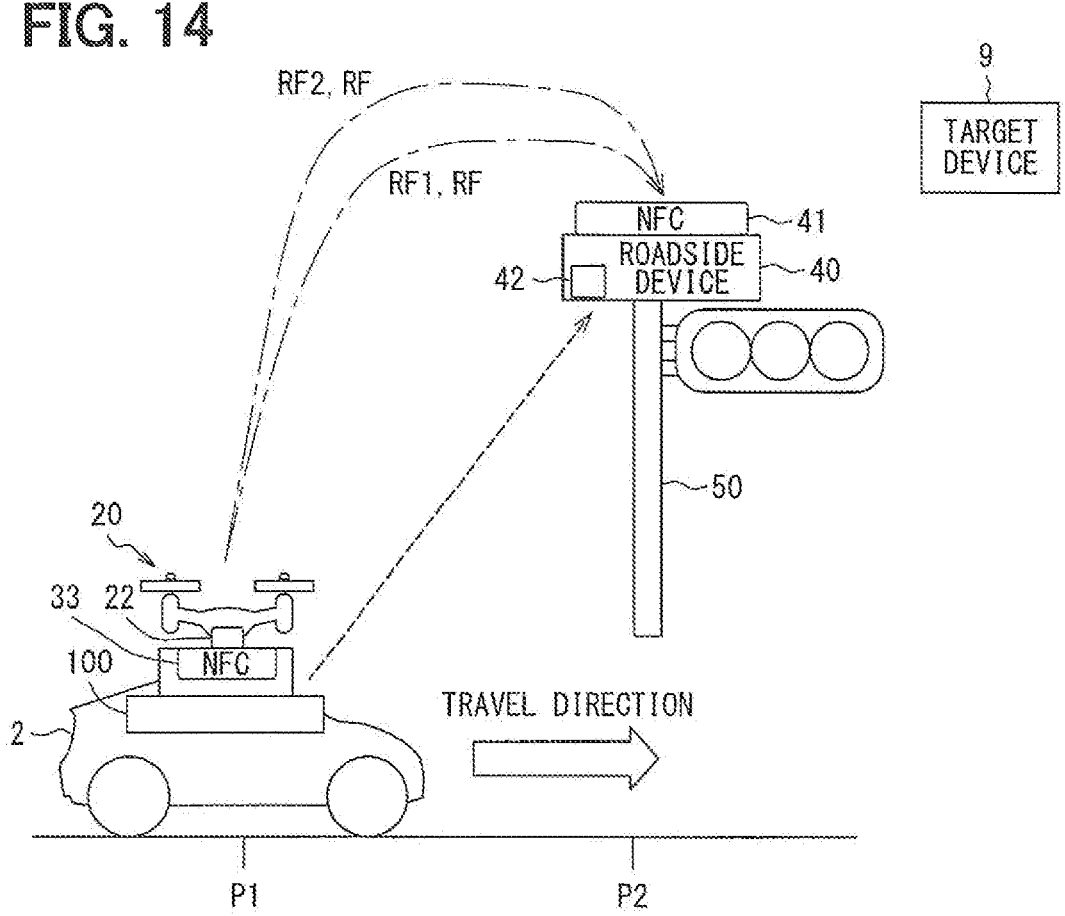
FIG. 14 illustrates a process performed by a communication controller in the fourth embodiment of the present disclosure.

The example illustrated in FIG. 14 assumes that the unmanned flight device 20 and the wireless communication device 3 are in an NFC enabled state, for data exchange, e.g., data transmission. In the fourth embodiment, the communication controller 100 transmits data to the unmanned flight device 20 via NFC, and searches for a transport path Pa including a flight path along which the unmanned flight device 20 flies to a roadside device 40. That is, the transport path Pa may include a flight path RF for the unmanned flight device 20, e.g., a flight path RF1 and a flight path RF2. The transport path Pa may also include a travel path of the vehicle 2 carrying the unmanned flight device 20 when the unmanned flight device 20 is not in flight, e.g., the travel of the vehicle 2 in an unmanned flight device 20 carrying state.

The roadside device 40 may be, for example, installed on top of a traffic signal 50, as shown in FIG. 14. The roadside device 40 is provided with a near-field communicator 41, and, when the unmanned flight device 20 lands on, or flies near the roadside device 40, the near-field communicator 41 of the roadside device 40 receives data from the unmanned flight device 20 via NFC. The roadside device 40 is also provided with a short-range communicator 42. Data may also be received by the roadside device 40 via the short-range communicator 42. The roadside device 40 is communicably connectable to the target device 9 via a wired or wireless connection, and transmits data received from the unmanned flight device 20 to the target device 9. The roadside device may also be referred to as a fixed station.

The transport path Pa with short-range communication is also searched for, as a candidate of the actual transport path Pa. Then, for each of the transport paths, the transport cost Ct is computed respectively, and the transport path Pa having the lowest transport cost Ct is determined as the actual transport path Pa which actually transports the data.

In FIG. 14, the unmanned flight device 20 may be used, for example, as a movable relay device. The unmanned flight device 20 may also be a data transporter that is capable of traveling to an instructed destination automatically or by remote control.

Hereafter, an operation of the communication controller 100 in the fourth embodiment is described in detail. In the fourth embodiment, when the transmission data obtainer 120 obtains data, the communication controller 100 performs the processes/process flow shown in FIG. 16.

Figure 16:
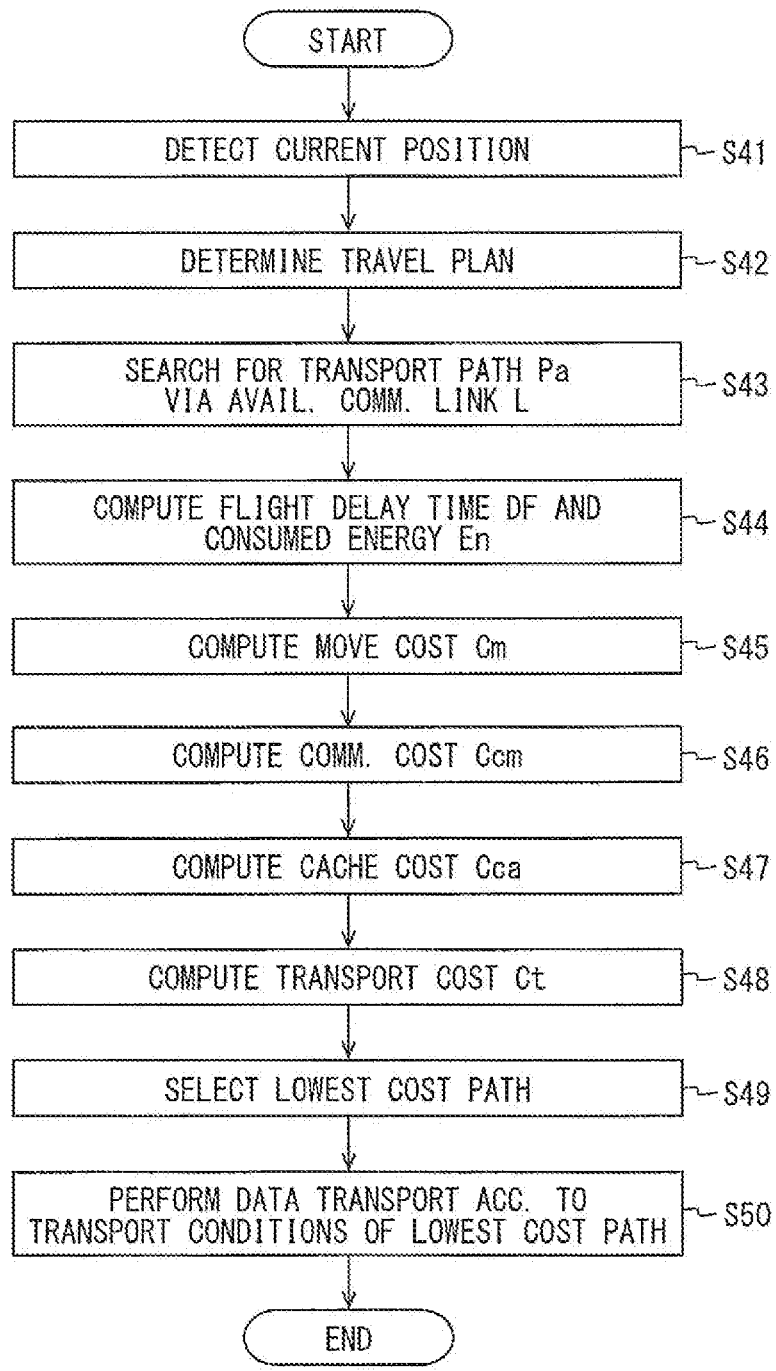
FIG. 16 is a flowchart of a part of the process performed by the communication controller in the fourth embodiment of the present disclosure.

The processes performed by the communication controller 100 at S41 and S42 in FIG. 16 are the same as the processes performed by the communication controller 100, e.g., by the searcher 140, at S1 and S2 in FIG. 3, that is, detect the current position at S41, and determine the travel plan 5 at S42.

At S43, the communication controller 100 searches for the transport path Pa by using or by way of an available communication link L. In addition to the wide-range communication link Lw and the short-range communication link Ls described in the preceding embodiments, a near-field communication link Ln may also be an available communication link L. The near-field communication link Ln is a communication link L which establishes a communication link (a) between the near-field communicator 22 and the near-field communicator 33, or (b) between the near-field communicator 33 and the near-field communicator 41.

The transport path Pa searched for by the communication controller 100 in S43 may be more practically described with reference to FIG. 14. A first transport path Pa1 may be a transport path where the current position of the vehicle 2 is at position P1. The path Pa1 is established as a near-field communication link Ln between the near-field communicator 33 of the wireless communication device 3 in the vehicle 2 and the near-field communicator 22 of the unmanned flight device 20, along which data is transmitted to the near-field communicator 22. Then, the unmanned flight device 20 flies to the roadside device 40. The flight path RF may be, for example, a shortest distance path from the vehicle 2 to the roadside device 40. Alternatively, in lieu of determining a shortest distance flight path RF, the flight path RF may also be a combination of vertical and horizontal flight distances to reduce at least one of the flight time of the unmanned flight device 20 or the flight energy (e.g., battery power) of the unmanned flight device 20. Further, if flight regulations or the like apply, the flight path RF may be searched for as a regulation-compliant path. After the landing of the unmanned flight device 20 on an upper surface of the roadside device 40, the near-field communication link Ln is established between the near-field communicator 22 of the unmanned flight device 20 and the near-field communicator 41 of the roadside device 40, and data transmission is performed from the unmanned flight device 20 to the roadside device 40. Then, data is transmitted further from the roadside device 40 to the target device 9. Alternatively, the unmanned flight device 20 may establish a near-field communication link Ln with the roadside device 40 by flying near the roadside device 40 instead of landing on the roadside device 40.

A second transport path Pa2 may be a second transport path where the vehicle 2 is at position P1. In this example, the short-range communicator 32 of the wireless communication device 3 in the vehicle 2 and the short-range communicator 42 of the roadside device 40 establish a short-range communication link Ls. Data is transmitted from the wireless communication device 3 to the roadside device 40 via the short-range communication link Ls. Then, data is transmitted further from the roadside device 40 to the target device 9.

A third transport path Pa3 may be a transport path where the flight of the unmanned flight device 20 starts when the vehicle 2 has traveled to position P2. That is, the travel start position (e.g., the flight start position) of the unmanned flight device 20 for transport path Pa3 is different from the first transport path Pa1. Position P2 is a position where the vehicle 2 comes closest to the roadside device 40, when the vehicle 2 travels by the travel plan 5. By the time the vehicle 2 travels to and arrives at position P2, the near-field communication link Ln between the near-field communicator 33 of the wireless communication device 3 and the near-field communicator 22 of the unmanned flight device 20 is established, and data transmission is performed to transmit data from the wireless communication device 3 to the unmanned flight device 20. Further, when the vehicle 2 arrives at position P2, the flight of the unmanned flight device starts. The transport path Pa of data after the landing of the unmanned flight device 20 on the upper surface of the roadside device 40 is the same as the first transport path Pa1.

Figure 17:
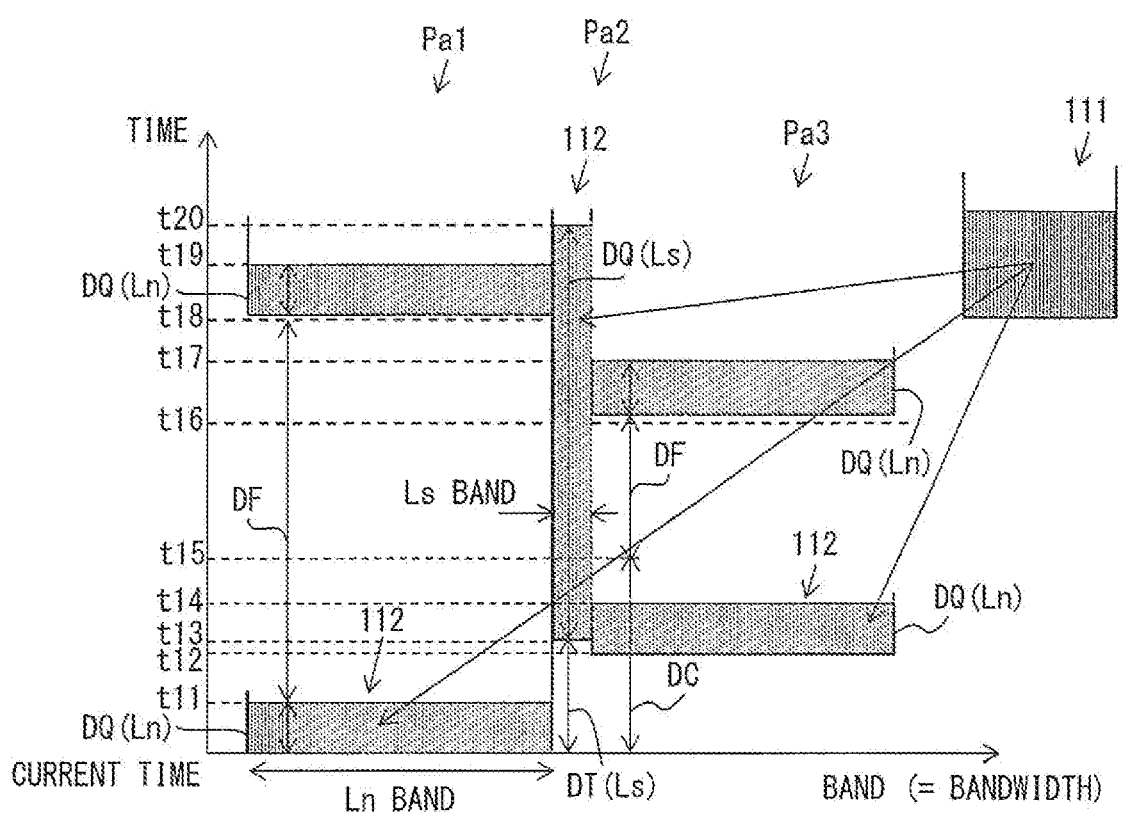
FIG. 17 illustrates a comparison between three data transport paths.

FIG. 17 illustrates, by comparison, the time required for data transportation to the roadside device 40 using the three paths Pa1, Pa2, and Pa3.

For the first transport path Pa1, data is written to the transmission queue 112 at a current time, and is transmitted from the near-field communicator 33 of the wireless communication device 3 to the near-field communicator 22 of the unmanned flight device 20. Since the transmission delay time DT of the near-field communication link Ln is short, it is not taken into consideration. The queuing delay time DQ(Ln) is the time from the current time to time t11 in this case.

Then, a flight delay time DF until the unmanned flight device 20 flies and reaches the roadside device 40 applies. The flight delay time DF is from time t1 to time t18. Further, after the unmanned flight device 20 lands on the upper surface of the roadside device 40, when the data transmission by the near-field communication link Ln is performed, the queuing delay time DQ(Ln) applies again. For the first transport path Pa1, the data transmission to the roadside device 40 is completed time t19. That is, the data transmission complete time for transport path Pa1 is at time t19.

For the second transport path Pa2, the transmission delay time DT(Ls) for establishing the short-range communication link Ls applies. Then, data is transmitted via the short-range communication link Ls. However, the bandwidth of the short-range communication is narrow compared with NFC. Therefore, the queuing delay time DQ(Ls) becomes longer than the queuing delay time DQ(Ln) in the near-field communication link Ln. As a result, the data transmission to the roadside device 40 for the second transport path is completed at time t20, which is later than time t19. That is, the data transmission complete time for the second transport path Pa2 is later than the data transmission complete time for the first transport path Pa1.

For the third transport path Pa3, the cache time DC for the vehicle 2 to arrive at position P2 applies. The cache time DC is time from the current time to time t15. Further, when data transmission from the near-field communicator 33 of the wireless communication device 3 to the near-field communicator 22 of the unmanned flight device 20 is performed, the queuing delay time DQ(Ln) applies. This queuing delay time DQ(Ln) is from time t12 to time t14. That is, by the time the vehicle 2 arrives at position P2, data is transmitted from the wireless communication device 3 to the unmanned flight device 20. Therefore, the time to transmit data from the wireless communication device 3 to the unmanned flight device 20 does not influence the time to transmit data to the roadside device 40.

The unmanned flight device 20 starts a flight at time t15 when the vehicle 2 arrives at position P2. The unmanned flight device 20 reaches the roadside device 40 at time t16. Then, the queuing delay time DQ(Ln) applies for the data transmission from the unmanned flight device 20 to the roadside device 40, and the data transmission is completed at time t17.

As shown in FIG. 17, the time to complete data transmission to the roadside device 40, i.e., the data transmission complete time, is the shortest for the transport path Pa3. Note that when the transport path Pa including the flight path RF is searched a return path of the unmanned flight device 20 back to the vehicle 2 is also searched.

For the third transport path Pa3, a data transmission start position is a position P2, which is in contrast to both of the first transport path Pa1 and the second transport path Pa2, where the data transmission start position in Pa1 and Pa2 is the current position of the vehicle 2 at P1. The data transmission start position serves as the communication state requirement, and the information, which (i) defines each of the transport paths Pa and (ii) includes the information of the data transmission start position, serves as the transport path information.

At S44, the communication controller 100 computes the flight delay time DF of the unmanned flight device 20 and a consumed energy En that is consumed in the flight for each of the transport paths Pa when the transport paths Pa including the flight path RF are found in the searched transport path Pa searched at S43. The consumed energy En may represent battery consumption or the like.

The communication controller 100 computes the flight delay time DF from the flight path RF and the travel speed of the unmanned flight device 20 for respective directions of the flight path RF. The flight path RF may be made up of many legs where the unmanned flight device 20 changes directions or orientations. The communication controller 100 computes the consumed energy En based on the energy consumption of the unmanned flight device 20 per unit time and the flight delay time DF. The energy consumption of the unmanned flight device 20 per unit time is set in advance. In calculating the consumed energy En, the speed change of the unmanned flight device 20 may be taken into consideration, because energy consumption may increase when the speed of the unmanned flight device 20 increases. That is, when the number of legs in the flight path RF increases where the unmanned flight device changes direction or orientations, so does the amount of speed changes in the unmanned flight device 20. Further, the consumed energy En includes the energy consumption in the return flight of the device 20 back from the roadside device 40 to the vehicle 2. Similarly, the return flight of the unmanned flight device 20 to the vehicle 2 may be made up of different legs where the unmanned flight device must change direction and speed from leg to leg.

At S45, the communication controller 100 computes a move cost Cm which is the cost for the flight of the unmanned flight device 20, for each of the transport paths Pa including the flight path RF. Computation of the move cost Cm uses the consumed energy En as a parameter, and the process computes it by using a function set up in advance to reflect an increase in the move cost Cm as the consumed energy En increases.

Further, the computation of the move cost Cm may also use a flight charge as an input parameter, when the flight of the unmanned flight device 20 is performed by a remote control, for example, which may incur flight charges.

At S46, the communication controller 100 computes a communication cost Ccm for each of the transport paths Pa. The communication cost Ccm is the cost for performing the communication. The computation of the communication cost Ccm uses a data transmission charge for communication via the communication link L, communication-related delay time D such as the queuing time delay DQ, the transmission delay time DT, and the like, as parameters. The communication cost Ccm may be set to increase as the data transmission charge increases and the transmission delay time DT increases. Note that the communication cost Ccm may be computed on a data by data basis for different data types, and the data-type specific costs may then be summed up as the total communication cost Ccm.

At S47, the communication controller 100 computes a cache cost Cca for each of the transport paths Pa. The cache cost Cca is the cost of moving and transporting the data within the movable body. The movable body in this case includes the vehicle 2 and the unmanned flight device 20. Therefore, computation of the cache cost Cca uses, as parameters, the cache time DC and the flight delay time DF of the unmanned flight device 20. The cache cost Cca may be set to increase, as the cache time DC and the flight delay time DF become longer.

An available storage capacity of the storage 23 and an amount of data may be added as parameters for the Cca computation. Alternatively, a ratio of data amount to the available storage capacity may be added to the parameter (e.g., a storage consumption ratio). The cache cost Cca may be set to increase, as the amount of data relative to the available capacity increases, or as the storage consumption ratio increases. The cache cost Cca may also be computed on a data by data basis, that is, by data type, with each respective data type then summed to determine a total cache cost Cca.

At S48, the communication controller 100 computes the transport cost Ct for each of the transport paths Pa. According to the fourth embodiment, the communication controller 100 computes the transport cost Ct using equation 4. Note that a travel parameter in this case is the parameter for computing the move cost Cm and the parameter for computing the cache cost Cca, and a communication parameter in this case is the parameter for computing the communication cost Ccm.

$$Ct = Cm + \Sigma_{(data)}\{Ccm + Cca\} \quad \text{(Equation 4)}$$

At S49, the communication controller 100 selects a transport path Pa having the lowest transport cost Ct as a path for actual data transport.

At S50, the communication controller 100 performs data transport according to transport conditions that are determined by the transport path Pa selected at S49. Transport conditions in this case are a data transmission start position and a flight start position of the unmanned flight device 20.

For example, when the third transport path Pa3 is selected, the data transmission start position may be an arbitrary position which enables the data transmission to the unmanned flight device 20 to complete before arrival of the vehicle 2 at position P2. The flight start position in the third transport path Pa3 is position P2. As such, data transmission to the unmanned flight device from the vehicle 2 is completed before the vehicle arrives at position P2.

According to the fourth embodiment, the vehicle 2 and the unmanned flight device 20 serve as the movable body, and the data transport cost by the movable body is represented by the cache cost Cca and the move cost Cm. The data transmission cost for communication is represented by the communication cost Ccm. Then, the transport cost Ct is computed from these costs, e.g., as the sum total of the cache cost Cca, the move cost Cm, and the communication cost Ccm.

Therefore, the transport cost Ct is a total cost of data transportation by communication and data transportation by using the movable body. Further, the transport path Pa is searched for and set as an actual transport path that minimizes the transport cost Ct, thereby data transportation to the target device 9 may be advantageously performed.

The present disclosure described above may further be modified and specified, without limitation. Examples of various modifications are described in the following paragraphs.

<Modification 1>

The energy required for writing the data to a data storage device or maintaining the data in the data storage device may be further included as a travel parameter. The energy required for the storage of data to the data storage device may be, for example, the electric power required for performing a data compression process or the like.

<Modification 2>

In the second embodiment, the candidates of the threshold bandwidth B are set from the threshold bandwidths B that can complete the data transmission by the maximum delay time Dmax. However, the candidates of the threshold bandwidth B may be set differently. That is, the completion of the data transmission by the maximum delay time Dmax may not be used to set the candidate threshold bandwidth B. In such cases, the threshold bandwidths B that cannot complete data transmission by the maximum delay time Dmax may be eliminated by the cost comparison process. That is, the transport cost Ct may be very high for such threshold bandwidths B.

<Modification 3>

In the second embodiment, the threshold bandwidths B are set without regard to the distance. However, the threshold bandwidths B may be set according to a ratio to the available bandwidth AB. Equation 5 may be used, for example, to set the threshold bandwidths B as a ratio to the available bandwidth AB. In equation 5, k is a constant smaller than 1.

$$B = kAB \qquad \text{(Equation 5)}$$

The available bandwidth AB may not be definitively determinable, as shown in FIG. 7. That is, the available bandwidth AB may only be determinable as a maximum value ABmax, a minimum value ABmin, an average value ABav, and the like, which are not uniquely associable to the distance. Therefore, the threshold bandwidth B may be set up according the above-described values ABmax, ABmin, ABav and the like.

When determining the threshold bandwidths B from the maximum ABmax, the minimum ABmin, and the average ABav of the available bandwidth AB, the factor AB in the equation 5 may be replaced with ABmax, ABmin, and ABav.

<Modification 4>

Each of the first to fourth embodiments is an embodiment which transmits data from the wireless communication device 3 to the target device 9. However, the data transmission direction may be reversed, that is, data may be transported from the target device 9 to the wireless communication device 3 by the communication controller of the present disclosure.

When transporting data from the target device 9 to the wireless communication device 3, the wireless communication device 3 receives data, i.e., is on a receiving side. When applying the present disclosure to the data reception, data may be transmitted from the target device 9 conditionally, for example, when the communication state requirements are satisfied. Data transmission upon satisfaction of the communication state requirements may be performed according to the following example schemes, that is, a first scheme and a second scheme.

In the first scheme, the wireless communication device 3 transmits a transmission request to the target device 9, upon detecting satisfaction of the communication state requirements. The transmission request may be, for example, transmitted as HTTP GET request method.

In the second scheme, the wireless communication device 3 notifies the target device 9 of a scheduled transmission time, e.g., when to receive the data, before detecting the satisfaction of the requirements.

Although the present disclosure has been substantially fully described regarding embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A communication controller for controlling a wireless communication device disposed or carried in a movable body to transport data to or from a target device, the communication controller comprising:
    a searcher configured to search for transport path information for one or more transport paths for transporting the data between the wireless communication device and the target device, wherein the transport path information includes communication state requirements, which are either of (i) conditions for a communication position, which is the position at which data communication is performed, or (ii) conditions for a communication state that varies according to the communication position, for the wireless communication device;
    a cost computer configured to compute a transport cost for transportation of the data between the wireless communication device and the target device for each of the transport path information for the one or more transport paths, wherein the transport cost is computed based on a travel parameter and a communication parameter, the travel parameter regarding includes at least one of a duration or distance of a travel of the movable body until the communication state requirements are satisfied, and the communication parameter regarding communication of the data by the wireless communication device when the communication state requirements are satisfied;
    a path determiner configured to determine the transport path information that defines the transport path for an actual transport of the data based on the transport cost computed by the cost computer for each of the transport path information; and
    a communication control section configured to control the wireless communication device to perform communication of the data when the communication state requirements that are included in the transport path information determined by the path determiner are satisfied and keep the data in a memory mean without communicating the data otherwise, wherein
    the searcher further configured to search for the transport path information to satisfy the communication state requirements of a communication bandwidth being greater than zero, when the communication bandwidth is derived by subtracting a threshold bandwidth from an available bandwidth, each of the transport path information searched by changing the threshold bandwidth, and
    the cost computer is further configured to compute the transport cost by using a communication-resources utilization rate as the communication parameter and by using a data holding time as the travel parameter, (i) the communication-resources utilization rate defined as a rate of the communication bandwidth to the available bandwidth and (ii) the data holding time defined as a time of holding the data during a travel of the movable body.

2. The communication controller of claim 1, wherein the cost computer is further configured to compute the transport cost as the communication parameter for each of the transport path information by including a communication charge of each of communication systems respectively used by the one or more transport paths.

3. The communication controller of claim 1, wherein when a movable relay device is available for relaying data, the searcher is further configured to search for the transport path information defining the transport path that includes the movable relay device.

4. The communication controller of claim 3, wherein
the movable body includes a first movable body and a second movable body, the first movable body having a first communication controller, and the second movable body having a second communication controller and configured to be movable independently from the first movable body,
the searcher is further configured to search for the transport path information of the transport path including the movable relay device when the communication controller obtains from the movable relay device a relay cost for transporting the data between the movable relay device and the target device, and
the cost computer is further configured to search the transport cost of the transport path including the movable relay device by computing a cost of transportation between the movable relay device and the target device as the relay cost.

5. The communication controller of claim 3, wherein
the movable relay device is a data transporter that is carried by the movable body in a near-field communication enabled state and configured to communicate with the wireless communication device and to store the data in a data storage, the data transporter movable automatically or by remote control, and wherein
the searcher is further configured to search for the transport path information of the transport path including (a) a path for communicating the data between the wireless communication device and the data transporter, and (b) a path for directly communicating the data between the data transporter and the target device after a travel of the data transporter to a fixed station that is provided with a near-field communicator and is communicable with the target device, search of the transport path information by the searcher performed for each of the transport path information for respectively different transport paths of the data transporter.

6. The communication controller of claim 5, wherein
the cost computer is configured to set a greater value to the travel parameter when an energy consumed by the travel of the data transporter increases.

7. The communication controller of claim 6, wherein the searcher is further configured to search for each of the transport path information for the respectively different transport paths having respectively different travel start positions of the data transporter.

8. A communication controller for controlling a wireless communication device disposed or carried in a movable body to transport data to or from a target device, the communication controller comprising:
a searcher configured to search for transport path information for one or more transport paths for transporting the data between the wireless communication device and the target device, wherein the transport path information includes communication state requirements, which are either of (i) conditions for a communication position, which is the position at which data communication is performed, or (ii) conditions for a communication state that varies according to the communication position, for the wireless communication device;
a cost computer configured to compute a transport cost for transportation of the data between the wireless communication device and the target device for each of the transport path information for the one or more transport paths, wherein the transport cost is computed based on a travel parameter and a communication parameter, the travel parameter regarding includes at least one of a duration or distance of a travel of the movable body until the communication state requirements are satisfied, and the communication parameter regarding communication of the data by the wireless communication device when the communication state requirements are satisfied;
a path determiner configured to determine the transport path information that defines the transport path for an actual transport of the data based on the transport cost computed by the cost computer for each of the transport path information; and
a communication control section configured to control the wireless communication device to perform communication of the data when the communication state requirements that are included in the transport path information determined by the path determiner are satisfied and keep the data in a memory mean without communicating the data otherwise, wherein
the cost computer is further configured to set a greater value to the travel parameter when a time to satisfy the communication state requirements is longer after storage of the data in a data storage.

9. The communication controller of claim 8, wherein
the cost computer is further configured to compute the transport cost by using an available capacity of the data storage and an amount of the data as the travel parameter.

* * * * *